(12) United States Patent
Gandhi et al.

(10) Patent No.: US 12,020,217 B2
(45) Date of Patent: Jun. 25, 2024

(54) SYSTEMS AND METHODS FOR USING MACHINE LEARNING FOR VEHICLE DAMAGE DETECTION AND REPAIR COST ESTIMATION

(71) Applicant: CDK GLOBAL, LLC, Hoffman Estates, IL (US)

(72) Inventors: Salil Gandhi, Pune (IN); Jitendra Choudhary, Pune (IN); Saurabh Kshirsagar, Maharashtra (IN); Papiya Debnath, Maharashtra (IN)

(73) Assignee: CDK GLOBAL, LLC, Hoffman Estates, IL (US)

( * ) Notice: Subject to any disclaimer, the term of this patent is extended or adjusted under 35 U.S.C. 154(b) by 349 days.

(21) Appl. No.: 17/095,395

(22) Filed: Nov. 11, 2020

(65) Prior Publication Data

US 2022/0148050 A1    May 12, 2022

(51) Int. Cl.
| | |
|---|---|
| *G06Q 10/20* | (2023.01) |
| *G06T 7/00* | (2017.01) |
| *G06V 10/82* | (2022.01) |
| *G06Q 30/0283* | (2023.01) |

(52) U.S. Cl.
CPC .......... *G06Q 10/20* (2013.01); *G06T 7/0004* (2013.01); *G06V 10/82* (2022.01); *G06Q 30/0283* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS http://web.archive.org/web/20010718130244/http://chromedata.com/maing2/about/index.asp, 1 pg.

(Continued)

*Primary Examiner* — William J Jacob
(74) *Attorney, Agent, or Firm* — Stoel Rives LLP

(57) ABSTRACT

Systems and methods for estimating the repair cost of one or more instances of vehicle damage pictured in a digital image are disclosed herein. These systems and methods may first use a damage detection neural network (NN) model to determine location(s), type(s), intensit(ies), and corresponding repair part(s) for pictured damage. Then, a repair cost estimation NN model may be given a damage type, a damage intensity, and the repair part(s) needed to determine a repair cost estimation. The training of each of the damage detection NN model and the repair cost estimation NN model is described. The manner of outputting results data corresponding to the systems and methods disclosed herein is also described.

20 Claims, 13 Drawing Sheets

(56) References Cited

U.S. PATENT DOCUMENTS

| | | |
|---|---|---|
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,674,805 B1 | 1/2004 | Kovacevic et al. |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |

(56) References Cited

U.S. PATENT DOCUMENTS

| | | |
|---|---|---|
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,122,716 B1 | 9/2015 | Naganathan et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,455,969 B1 | 9/2016 | Cabrera et al. |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 9,983,982 B1 | 3/2018 | Kumar et al. |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,509,696 B1 | 12/2019 | Gilderman et al. |
| 10,541,938 B1 | 1/2020 | Timmerman et al. |
| 10,552,871 B1 | 2/2020 | Chadwick |
| 10,657,707 B1* | 5/2020 | Leise .................. G06T 17/00 |
| 11,080,105 B1 | 8/2021 | Birkett et al. |
| 11,117,253 B2 | 9/2021 | Oleynik |
| 11,190,608 B2 | 11/2021 | Amar et al. |
| 11,282,041 B2 | 3/2022 | Sanderford et al. |
| 11,322,247 B2 | 5/2022 | Bullington et al. |
| 11,392,855 B1* | 7/2022 | Murakonda ............ G06N 5/01 |
| 11,443,275 B1 | 9/2022 | Prakash et al. |
| 11,468,089 B1 | 10/2022 | Bales et al. |
| 11,507,892 B1 | 11/2022 | Henckel et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116197 A1* | 8/2002 | Erten .................. G06F 18/254 |
| | | 704/E15.042 |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |

(56) References Cited

U.S. PATENT DOCUMENTS

| | | |
|---|---|---|
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0043614 A1* | 2/2005 | Huizenga ............ A61B 5/02007 600/427 |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0004725 A1 | 1/2006 | Abraido-Fandino |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248205 A1 | 11/2006 | Randle et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2007/0299940 A1 | 12/2007 | Gbadegesin et al. |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0265648 A1 | 10/2012 | Jerome et al. |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |

(56) References Cited

U.S. PATENT DOCUMENTS

| | | | |
|---|---|---|---|
| 2013/0080305 A1 | 3/2013 | Virag et al. | |
| 2013/0151334 A1 | 6/2013 | Berkhin et al. | |
| 2013/0151468 A1 | 6/2013 | Wu et al. | |
| 2013/0191445 A1 | 7/2013 | Gayman et al. | |
| 2013/0204484 A1 | 8/2013 | Ricci | |
| 2013/0226699 A1 | 8/2013 | Long | |
| 2013/0317864 A1* | 11/2013 | Tofte | G06Q 10/06 705/4 |
| 2013/0325541 A1 | 12/2013 | Capriotti et al. | |
| 2013/0332023 A1 | 12/2013 | Bertosa et al. | |
| 2014/0012659 A1 | 1/2014 | Yan | |
| 2014/0026037 A1 | 1/2014 | Garb et al. | |
| 2014/0052327 A1 | 2/2014 | Hosein et al. | |
| 2014/0081675 A1* | 3/2014 | Ives | G06Q 40/08 705/4 |
| 2014/0088866 A1 | 3/2014 | Knapp et al. | |
| 2014/0094992 A1 | 4/2014 | Lambert et al. | |
| 2014/0122178 A1 | 5/2014 | Knight | |
| 2014/0136278 A1 | 5/2014 | Carvalho | |
| 2014/0229207 A1* | 8/2014 | Swamy | G06V 10/462 705/4 |
| 2014/0229391 A1 | 8/2014 | East et al. | |
| 2014/0244110 A1 | 8/2014 | Tharaldson et al. | |
| 2014/0277906 A1 | 9/2014 | Lowrey et al. | |
| 2014/0278805 A1 | 9/2014 | Thompson | |
| 2014/0316825 A1 | 10/2014 | Van Dijk et al. | |
| 2014/0324275 A1 | 10/2014 | Stanek et al. | |
| 2014/0324536 A1 | 10/2014 | Cotton | |
| 2014/0331301 A1 | 11/2014 | Subramani et al. | |
| 2014/0337163 A1 | 11/2014 | Whisnant | |
| 2014/0337825 A1 | 11/2014 | Challa et al. | |
| 2014/0379530 A1 | 12/2014 | Kim et al. | |
| 2014/0379817 A1 | 12/2014 | Logue et al. | |
| 2015/0032546 A1 | 1/2015 | Calman et al. | |
| 2015/0057875 A1 | 2/2015 | McGinnis et al. | |
| 2015/0058151 A1 | 2/2015 | Sims et al. | |
| 2015/0066781 A1 | 3/2015 | Johnson et al. | |
| 2015/0066933 A1 | 3/2015 | Kolodziej et al. | |
| 2015/0100199 A1 | 4/2015 | Kurnik et al. | |
| 2015/0142256 A1 | 5/2015 | Jones | |
| 2015/0142535 A1 | 5/2015 | Payne et al. | |
| 2015/0207701 A1 | 7/2015 | Faaborg et al. | |
| 2015/0227894 A1 | 8/2015 | Mapes, Jr. et al. | |
| 2015/0242819 A1 | 8/2015 | Moses et al. | |
| 2015/0248761 A1* | 9/2015 | Dong | G06F 3/017 382/203 |
| 2015/0254591 A1 | 9/2015 | Raskind | |
| 2015/0268059 A1 | 9/2015 | Borghesani et al. | |
| 2015/0268975 A1 | 9/2015 | Du et al. | |
| 2015/0278886 A1 | 10/2015 | Fusz | |
| 2015/0286475 A1 | 10/2015 | Vangelov et al. | |
| 2015/0286979 A1 | 10/2015 | Ming et al. | |
| 2015/0290795 A1 | 10/2015 | Oleynik | |
| 2015/0334165 A1 | 11/2015 | Arling et al. | |
| 2016/0004516 A1 | 1/2016 | Ivanov et al. | |
| 2016/0059412 A1 | 3/2016 | Oleynik | |
| 2016/0071054 A1 | 3/2016 | Kakarala et al. | |
| 2016/0092944 A1 | 3/2016 | Taylor et al. | |
| 2016/0132935 A1 | 5/2016 | Shen et al. | |
| 2016/0140609 A1 | 5/2016 | Demir | |
| 2016/0140620 A1 | 5/2016 | Pinkowish et al. | |
| 2016/0140622 A1 | 5/2016 | Wang et al. | |
| 2016/0148439 A1 | 5/2016 | Akselrod et al. | |
| 2016/0162817 A1 | 6/2016 | Grimaldi et al. | |
| 2016/0179968 A1 | 6/2016 | Ormseth et al. | |
| 2016/0180358 A1 | 6/2016 | Battista | |
| 2016/0180378 A1 | 6/2016 | Toshida et al. | |
| 2016/0180418 A1 | 6/2016 | Jaeger | |
| 2016/0267503 A1 | 9/2016 | Zakai-Or et al. | |
| 2016/0275533 A1 | 9/2016 | Smith et al. | |
| 2016/0277510 A1 | 9/2016 | Du et al. | |
| 2016/0307174 A1 | 10/2016 | Marcelle et al. | |
| 2016/0335727 A1* | 11/2016 | Jimenez | G06Q 40/08 |
| 2016/0337278 A1 | 11/2016 | Peruri et al. | |
| 2016/0357599 A1 | 12/2016 | Glatfelter | |
| 2016/0371641 A1 | 12/2016 | Wilson et al. | |
| 2017/0034547 A1 | 2/2017 | Jain et al. | |
| 2017/0039785 A1 | 2/2017 | Richter et al. | |
| 2017/0053460 A1 | 2/2017 | Hauser et al. | |
| 2017/0060929 A1 | 3/2017 | Chesla et al. | |
| 2017/0064038 A1 | 3/2017 | Chen | |
| 2017/0093700 A1 | 3/2017 | Gilley et al. | |
| 2017/0124525 A1 | 5/2017 | Johnson et al. | |
| 2017/0126848 A1 | 5/2017 | George et al. | |
| 2017/0206465 A1* | 7/2017 | Jin | G06F 16/5866 |
| 2017/0262894 A1 | 9/2017 | Kirti et al. | |
| 2017/0293894 A1 | 10/2017 | Taliwal et al. | |
| 2017/0308844 A1 | 10/2017 | Kelley | |
| 2017/0308864 A1 | 10/2017 | Kelley | |
| 2017/0308865 A1 | 10/2017 | Kelley | |
| 2017/0316459 A1 | 11/2017 | Strauss et al. | |
| 2017/0337573 A1 | 11/2017 | Toprak | |
| 2017/0352054 A1 | 12/2017 | Ma et al. | |
| 2017/0359216 A1 | 12/2017 | Naiden et al. | |
| 2017/0364733 A1* | 12/2017 | Estrada | G06V 20/13 |
| 2018/0067932 A1 | 3/2018 | Paterson et al. | |
| 2018/0074864 A1 | 3/2018 | Chen et al. | |
| 2018/0095733 A1 | 4/2018 | Torman et al. | |
| 2018/0173806 A1 | 6/2018 | Forstmann et al. | |
| 2018/0204281 A1 | 7/2018 | Painter et al. | |
| 2018/0225710 A1 | 8/2018 | Kar et al. | |
| 2018/0232749 A1 | 8/2018 | Moore, Jr. et al. | |
| 2018/0285901 A1 | 10/2018 | Zackrone | |
| 2018/0285925 A1 | 10/2018 | Zackrone | |
| 2018/0300124 A1 | 10/2018 | Malladi et al. | |
| 2019/0028360 A1 | 1/2019 | Douglas et al. | |
| 2019/0073641 A1* | 3/2019 | Utke | G06Q 10/0875 |
| 2019/0114330 A1 | 4/2019 | Xu et al. | |
| 2019/0213426 A1* | 7/2019 | Chen | G06T 7/20 |
| 2019/0294878 A1* | 9/2019 | Endras | G06V 20/10 |
| 2019/0297162 A1 | 9/2019 | Amar et al. | |
| 2019/0334884 A1 | 10/2019 | Ross et al. | |
| 2020/0019388 A1 | 1/2020 | Jaeger et al. | |
| 2020/0038363 A1 | 2/2020 | Kim | |
| 2020/0050879 A1* | 2/2020 | Zaman | G06T 5/50 |
| 2020/0066067 A1* | 2/2020 | Herman | G07C 5/0808 |
| 2020/0118365 A1* | 4/2020 | Wang | G06Q 10/20 |
| 2020/0177476 A1 | 6/2020 | Agarwal et al. | |
| 2020/0327371 A1 | 10/2020 | Sharma et al. | |
| 2021/0072976 A1 | 3/2021 | Chintagunta et al. | |
| 2021/0090694 A1 | 3/2021 | Colley et al. | |
| 2021/0157562 A1 | 5/2021 | Sethi et al. | |
| 2021/0184780 A1 | 6/2021 | Yang et al. | |
| 2021/0224975 A1* | 7/2021 | Ranca | G06Q 30/0283 |
| 2021/0240657 A1 | 8/2021 | Kumar et al. | |
| 2021/0256616 A1* | 8/2021 | Hayward | G06V 30/194 |
| 2021/0287106 A1 | 9/2021 | Jerram | |
| 2021/0303644 A1 | 9/2021 | Shear | |
| 2021/0350334 A1 | 11/2021 | Ave et al. | |
| 2021/0359940 A1 | 11/2021 | Shen et al. | |
| 2022/0020086 A1 | 1/2022 | Kuchenbecker et al. | |
| 2022/0028928 A1 | 1/2022 | Seo et al. | |
| 2022/0046105 A1 | 2/2022 | Amar et al. | |
| 2022/0172723 A1 | 6/2022 | Tendolkar et al. | |
| 2022/0191663 A1 | 6/2022 | Karpoor et al. | |
| 2022/0208319 A1 | 6/2022 | Ansari et al. | |
| 2022/0237084 A1 | 7/2022 | Bhagi et al. | |
| 2022/0237171 A1 | 7/2022 | Bailey et al. | |
| 2022/0293107 A1 | 9/2022 | Leaman et al. | |
| 2022/0300735 A1 | 9/2022 | Kelly et al. | |
| 2023/0214892 A1 | 7/2023 | Christian et al. | |

OTHER PUBLICATIONS http://web.archive.org/web/20050305055408/http://www.dealerclick.com/, 1 pg.

http://web.archive.org/web/20050528073821/http://www.kbb.com/, 1 pg.

http://web.archive.org/web/20050531000823/http://www.carfax.com/, 1 pg.

Internet Archive Dan Gillmor Sep. 1, 1996.

Internet Archive Wayback Machine, archive of LDAP Browser. com—FAQ. Archived Dec. 11, 2000. Available at <http://web.

(56) References Cited

OTHER PUBLICATIONS archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
Trademark Application, Serial No. 76375405. 13 pages of advertising material and other application papers enclosed. Available from Trademark Document Retrieval system at.
Trademark Electronic Search System record for Serial No. 76375405, Word Mark "NITRA".
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"IBM Tivoli Access Manager Base Administration Guide", Version 5.1. International Business Machines Corporation. Entire book enclosed and cited., 2003, 402 pgs.
"NetFormx Offers Advanced Network Discovery Software", PR Newswire. Retrieved from http://www.highbeam.com/doc/1G1-54102907.html>., Mar. 15, 1999.
"Openbay Announces First-of-its-Kind Connected Car Repair Service", openbay.com, Mar. 31, 2015, 14 pages.
"Service Advisor", Automotive Dealership Institute, 2007, 26 pages.
"xTime.com Web Pages", Jan. 8, 2015, 1 page.
"xTimes Newsletter", vol. 7, 2013, 4 pages.
U.S. Appl. No. 10/350,795, Non-Final Office Action, Dec. 26, 2008, 13 pages.
U.S. Appl. No. 10/350,795, Non-Final Office Action, Feb. 6, 2006, 11 pages.
U.S. Appl. No. 10/350,795, Non-Final Office Action, Jul. 22, 2009, 22 pages.
U.S. Appl. No. 10/350,795, Final Office Action, Jul. 6, 2041, 26 pages.
U.S. Appl. No. 10/350,795, Non-Final Office Action, Jun. 29, 2006, 11 pages.
U.S. Appl. No. 10/350,795, Non-Final Office Action, Mar. 12, 2007, 10 pages.
U.S. Appl. No. 10/350,795, Final Office Action, Mar. 3, 2010, 24 pages.
U.S. Appl. No. 10/350,795, Non-Final Office Action, May 29, 2008, 10 pages.
U.S. Appl. No. 10/350,795, Notice of Allowance, May 7, 2012, 15 pages.
U.S. Appl. No. 10/350,795, Non-Final Office Action, Nov. 1, 2010, 19 pages.
U.S. Appl. No. 10/350,796, Notice of Allowance, Feb. 1, 2006, 5 pages.
U.S. Appl. No. 10/350,796, Non-Final Office Action, May 19, 2005, 7 pages.
U.S. Appl. No. 10/350,810, Notice of Allowance, Apr. 14, 2008, 6 pages.
U.S. Appl. No. 10/350,810, Non-Final Office Action, Apr. 17, 2007, 12 pages.
U.S. Appl. No. 10/350,810, Final Office Action, Apr. 5, 2005, 12 pages.
U.S. Appl. No. 10/350,810, Notice of Non-compliant Amendment, Dec. 12, 2006.
U.S. Appl. No. 10/350,810, Non-Final Office Action, Dec. 9, 2005, 14 pages.
U.S. Appl. No. 10/350,810, Final Office Action, May 18, 2006, 15 pages.
U.S. Appl. No. 10/350,810, Final Office Action, Nov. 14, 2007, 13 pages.
U.S. Appl. No. 10/350,810, Non-Final Office Action, Sep. 22, 2004, 10 pages.
U.S. Appl. No. 10/351,465, Non-Final Office Action, Jul. 27, 2004, 9 pages.
U.S. Appl. No. 10/351,465, Final Office Action, May 5, 2005, 8 pages.
U.S. Appl. No. 10/351,465, Notice of Allowance, Sep. 21, 2005, 4 pages.
U.S. Appl. No. 10/351,606, Notice of Allowance, Apr. 4, 2006, 12 pages.
U.S. Appl. No. 10/351,606, Non-final Office Action, May 17, 2004, 5 pages.
U.S. Appl. No. 10/351,606, Non-final Office Action, Dec. 19, 2005, 7 pages.
U.S. Appl. No. 10/655,899, Non-Final Office Action, Sep. 17, 2007, 11 pages.
U.S. Appl. No. 10/665,899, Non-Final Office Action, Aug. 30, 2010, 23 pages.
U.S. Appl. No. 16/951,833, Notice of Allowance, Jun. 16, 2021, 14 pages.
Hu, Bo, "A Platform based Distributed Service Framework for Large-scale Cloud Ecosystem Development", IEEE Computer Society, 2015, 8 pages.
U.S. Appl. No. 15/478,042, Non-Final Office Action, Nov. 19, 2021, 45 pages.
U.S. Appl. No. 16/911,154, Final Office Action, Mar. 28, 2022, 17 pages.
U.S. Appl. No. 17/156,254, Non-Final Office Action, Feb. 25, 2022, 18 pages.
U.S. Appl. No. 13/025,019, Non-Final Office Action, Oct. 6, 2017.
U.S. Appl. No. 13/025,019, Final Office Action, Sep. 12, 2013, 13 pages.
U.S. Appl. No. 13/025,019, Non-Final Office Action, Sep. 18, 2014, 15 pages.
U.S. Appl. No. 13/025,019, Notice of Allowance, Sep. 26, 2019, 9 pages.
U.S. Appl. No. 14/208,042, Final Office Action, Apr. 16, 2018.
U.S. Appl. No. 14/208,042, Non-Final Office Action, Aug. 21, 2020, 13 pages.
U.S. Appl. No. 14/208,042, Final Office Action, Dec. 6, 2016, 26 pages.
Chen, Deren "Business to Business Standard and Supply Chain System Framework in Virtual Enterprises", Compuer Supported Cooperative Work in Design, The Sixth International Conference on 2001, pp. 472-476.
U.S. Appl. No. 14/208,042, Final Office Action, Jan. 11, 2019, 16 pages.
U.S. Appl. No. 14/208,042, Advisory Action, Jul. 12, 2018.
U.S. Appl. No. 14/208,042, Non-Final Office Action, Jun. 30, 2016, 23 pages.
U.S. Appl. No. 14/208,042, Notice of Allowance, May 6, 2021, 13 pages.
U.S. Appl. No. 14/208,042, Non-Final Office Action, Sep. 20, 2017.
U.S. Appl. No. 14/208,042, Non-Final Office Action, Sep. 21, 2018.
U.S. Appl. No. 15/134,779, Final Office Action, Feb. 27, 2020, 18 pages.
U.S. Appl. No. 15/134,779, Non-Final Office Action, Jan. 30, 2019, 26 pages.
U.S. Appl. No. 15/134,779, Advisory Action, Jul. 29, 2019, 6 pages.
U.S. Appl. No. 15/134,779, Final Office Action, May 17, 2019, 25 pages.
U.S. Appl. No. 15/134,779, Non-Final Office Action, Nov. 19, 2019, 27 pages.
U.S. Appl. No. 15/134,779, Notice of Allowance, Sep. 9, 2020, 12 pages.

(56) References Cited

OTHER PUBLICATIONS

U.S. Appl. No. 15/134,793, Non-Final Office Action, Jan. 30, 2019, 26 pages.
U.S. Appl. No. 15/134,793, Advisory Action, Jul. 29, 2019, 6 pages.
U.S. Appl. No. 15/134,793, Final Office Action, Mar. 27, 2020, 22 pages.
U.S. Appl. No. 15/134,793, Final Office Action, May 13, 2019, 26 pages.
U.S. Appl. No. 15/134,793, Non-Final Office Action, Nov. 19, 2019, 31 pages.
U.S. Appl. No. 15/134,793, Notice of Allowance, Nov. 2, 2020, 13 pages.
U.S. Appl. No. 15/134,820, Non-Final Office Action, Feb. 23, 2018.
U.S. Appl. No. 15/134,820, Notice of Allowance, Jan. 28, 2019, 7 pages.
U.S. Appl. No. 15/134,820, Final Office Action, Sep. 21, 2018.
U.S. Appl. No. 15/478,042, Non-Final Office Action, Aug. 4, 2020, 42 pages.
U.S. Appl. No. 15/478,042, Final Office Action, Mar. 19, 2020, 35 pages.
U.S. Appl. No. 15/478,042, Final Office Action, May 5, 2021, 38 pages.
U.S. Appl. No. 15/478,042, Non-Final Office Action, Oct. 10, 2019, 26 pages.
U.S. Appl. No. 15/478,048, Final Office Action, Apr. 9, 2020, 42 pages.
U.S. Appl. No. 15/478,048, Non-Final Office Action, Mar. 8, 2021, 69 pages.
U.S. Appl. No. 15/478,048, Non-Final Office Action, Sep. 30, 2019, 30 pages.
U.S. Appl. No. 15/602,999, Notice of Allowance, Apr. 18, 2019, 6 pages.
U.S. Appl. No. 15/602,999, Advisory Action, Jan. 31, 2019, 3 pages.
U.S. Appl. No. 15/602,999, Non-Final Office Action, May 3, 2018.
U.S. Appl. No. 15/602,999, Final Office Action, Nov. 21, 2018.
U.S. Appl. No. 16/041,552, Final Office Action, Apr. 27, 2021, 23 pages.
U.S. Appl. No. 16/041,552, Non-Final Office Action, Dec. 27, 2019, 13 pages.
U.S. Appl. No. 16/041,552, Final Office Action, May 29, 2020, 18 pages.
U.S. Appl. No. 16/041,552, Non-Final Office Action, Sep. 17, 2020, 16 pages.
U.S. Appl. No. 16/951,833, Non-Final Office Action, Feb. 4, 2021, 10 pages.
Aloisio, Giovanni, et al., "Web-based access to the Grid using the Grid Resource Broker portal", Google, 2002, pp. 1145-1160.
Anonymous, "Software ready for prime time", Automotive News. Detroit, vol. 76, Issue 5996, Nov. 5, 2001, p. 28.
Bedell, Doug, Dallas Morning News, "I Know Someone Who Knows Kevin Bacon". Oct. 27, 1998. 4 pgs.
Chadwick, D.W., "Understanding X.500—The Directory", Available at <http://sec.cs.kent.ac.uk/x500book/>. Entire work cited., 1996.
Chatterjee, Pallab, et al., "On-board diagnostics not just for racing anymore", EDN.com, May 6, 2013, 7 pages.
Clemens Grelck, "A Multithread Compiler Backend for High-Level Array Programming", 2003.
CNY Business Journal, "Frank La Voila named Southern Tier Small-Business Person of 1999", Jun. 11, 1999, 2 pages.
Croswell, Wayne, "Service Shop Optimiztion", Modern Tire Retailer, May 21, 2013, 7 pages.
Davis, Peter T., et al., "Sams Teach Yourself Microsoft Windows NT Server 4 in 21 Days", Sams® Publishing, ISBN: 0-672-31555-6, 1999, printed Dec. 21, 2008, 15 pages.
Derfler, Frank J., et al., "How Networks Work: Millennium Edition", Que, A Division of Macmillan Computer Publishing, ISBN: 0-7897-2445-6, 2000, 9 pages.
Drawbaugh, Ben, "Automatic Link Review: an expensive way to learn better driving habits", Endgadget.com, Nov. 26, 2013, 14 pages.
Emmanuel, Daniel, "Basics to Creating an Appointment System for Automotive Service Customers", Automotiveservicemanagement.com, 2006, 9 pages.
Hogue, et al., "Thresher: Automating the Unwrapping of Semantic Content from the World Wide Web", ACM, 2005, pp. 86-95.
Housel, Barron C., et al., "WebExpress: A client/intercept based system for optimizing Web browsing in a wireless environment", Google, 1998, pp. 419-431.
Interconnection, In Roget's II The New Thesaurus. Boston, MA: Houghton Mifflin http://www.credoreference.com/entry/hmrogets/interconnection, 2003, Retrieved Jul. 16, 2009, 1 page.
Jenkins, Will, "Real-time vehicle performance monitoring with data intergrity", A Thesis Submitted to the Faculty of Mississippi State University, Oct. 2006, 57 pages.
Johns, Pamela, et al., "Competitive intelligence in service marketing", Marketing Intelligence & Planning, vol. 28, No. 5, 2010, pp. 551-570.
Lavrinc, Damon, "First Android-powered infotainment system coming to 2012 Saab 9-3", Autoblog.com, Mar. 2, 2011, 8 pages.
Lee, Adam J., et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.
Michener, J.R., et al., "Managing System and Active-Content Integrity", Computer; vol. 33, Issue: 7, 2000, pp. 108-110.
Milic-Frayling, Natasa, et al., "SmartView: Enhanced Document Viewer for Mobile Devices", Google, Nov. 15, 2002, 11 pages.
Needham, Charlie, "Google Now Taking Appointments for Auto Repair Shops", Autoshopsolutions.com, Aug. 25, 2015, 6 pages.
Open Bank Project, https://www.openbankproject.com/, retrieved Nov. 23, 2020, 10 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive.org, May 14, 2019, Mar. 2015, 11 pages.
Phelan, Mark, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Standards for Technology in Auto, https://www.starstandard.org/, retrieved Nov. 23, 2020, 4 pages.
Strebe, Matthew, et al., MCSE: NT Server 4 Study Guide, Third Edition. Sybex Inc. Front matter, 2000, pp. 284-293, and 308-347.
Warren, Tamara, "This Device Determines What Ails Your Car and Finds a Repair Shop—Automatically", CarAndDriver.com, Apr. 8, 2015, 7 pages.
You, Song, et al., "Overview of Remote Diagnosis and Maintenance for Automotive Systems", 2005 SAE World Congress, Apr. 11-14, 2015, 10 pages.
U.S. Appl. No. 10/665,899, Final Office Action, Feb. 24, 2010, 22 pages.
U.S. Appl. No. 10/665,899, Final Office Action, Jul. 7, 2008, 11 pages.
U.S. Appl. No. 10/665,899, Final Office Action, Mar. 8, 2011, 21 pages.
U.S. Appl. No. 10/665,899, Final Office Action, May 11, 2009, 14 pages.
U.S. Appl. No. 10/665,899, Non-Final Office Action, Nov. 13, 2008, 11 pages.
U.S. Appl. No. 10/665,899, Non-Final Office Action, Sep. 14, 2009, 14 pages.
U.S. Appl. No. 11/149,909, Final Office Action, Feb. 4, 2009, 14 pages.
U.S. Appl. No. 11/149,909, Non-Final Office Action, May 13, 2008, 14 pages.
U.S. Appl. No. 11/149,909, Non-Final Office Action, May 6, 2009, 6 pages.

(56) References Cited

OTHER PUBLICATIONS

U.S. Appl. No. 11/149,909, Notice of Allowance, Sep. 16, 2009, 7 pages.
U.S. Appl. No. 11/414,939, Non-Final Office Action, Jul. 19, 2010, 7 pages.
U.S. Appl. No. 11/414,939, Non-Final Office Action, Mar. 9, 2010, 11 pages.
U.S. Appl. No. 11/414,939, Notice of Allowance, Nov. 2, 2010.
U.S. Appl. No. 11/442,821, Final Office Action, Apr. 7, 2009, 19 pages.
U.S. Appl. No. 11/442,821, Notice of Allowance, Jul. 30, 2012, 6 pages.
U.S. Appl. No. 11/442,821, Non-Final Office Action, Jun. 1, 2011, 23 pages.
U.S. Appl. No. 11/442,821, Final Office Action, May 21, 2010, 28 pages.
U.S. Appl. No. 11/442,821, Non-Final Office Action, Nov. 12, 2009, 19 pages.
U.S. Appl. No. 11/442,821, Final Office Action, Nov. 29, 2011, 26 pages.
U.S. Appl. No. 11/442,821, Non-Final Office Action, Sep. 3, 2008, 14 pages.
U.S. Appl. No. 11/446,011, Notice of Allowance, Aug. 9, 2011, 10 pages.
U.S. Appl. No. 11/446,011, Final Office Action, Jun. 8, 2010, 12 pages.
U.S. Appl. No. 11/446,011, Non-Final Office Action, Mar. 1, 2011, 15 pages.
U.S. Appl. No. 11/446,011, Non-Final Office Action, Nov. 27, 2009, 14 pages.
U.S. Appl. No. 11/524,602, Notice of Allowance, Aug. 6, 2013, 22 pages.
U.S. Appl. No. 11/524,602, Non-Final Office Action, Dec. 11, 2009, 20 pages.
U.S. Appl. No. 11/524,602, Final Office Action, Jul. 27, 2010, 13 pages.
U.S. Appl. No. 11/524,602, Final Office Action, Jun. 26, 2012, 11 pages.
U.S. Appl. No. 11/524,602, Non-Final Office Action, Nov. 14, 2011, 19 pages.
U.S. Appl. No. 11/525,009, Non-Final Office Action, Aug. 10, 2011, 18 pages.
U.S. Appl. No. 11/525,009, Final Office Action, Aug. 3, 2010, 16 pages.
U.S. Appl. No. 11/525,009, Non-Final Office Action, Dec. 16, 2009, 20 pages.
U.S. Appl. No. 11/525,009, Notice of Allowance, Jul. 23, 2012, 19 pages.
U.S. Appl. No. 12/243,852, Restriction Requirement, Dec. 7, 2010.
U.S. Appl. No. 12/243,852, Notice of Allowance, Feb. 27, 2013, 6 pages.
U.S. Appl. No. 12/243,852, Non-Final Office Action, Jan. 16, 2013, 5 pages.
U.S. Appl. No. 12/243,852, Non-Final Office Action, Mar. 17, 2011, 8 pages.
U.S. Appl. No. 12/243,852, Supplemental Notice of Allowability, Mar. 19, 2013, 3 pages.
U.S. Appl. No. 12/243,852, Final Office Action, Oct. 24, 2011, 13 pages.
U.S. Appl. No. 12/243,855, Notice of Allowance, Nov. 22, 2010, 10 pages.
U.S. Appl. No. 12/243,855, Non-Final Office Action, Oct. 14, 2010, 6 pages.
U.S. Appl. No. 12/243,855, Notice of Allowance, Oct. 28, 2010, 5 pages.
U.S. Appl. No. 12/243,861, Final Office Action, Jun. 22, 2011, 5 pages.
U.S. Appl. No. 12/243,861, Non-Final Office Action, Nov. 8, 2010, 8 pgs.
U.S. Appl. No. 12/243,861, Notice of Allowance, Sep. 6, 2011, 10 pgs.
U.S. Appl. No. 13/025,019, Non-Final Office Action, Apr. 22, 2016, 16 pages.
U.S. Appl. No. 13/025,019, Non-Final Office Action, Apr. 5, 2013, 15 pages.
U.S. Appl. No. 13/025,019, Final Office Action, Aug. 28, 2015, 25 pages.
U.S. Appl. No. 13/025,019, Final Office Action, Dec. 20, 2016, 16 pages.
U.S. Appl. No. 13/025,019, Final Office Action, Jul. 13, 2018, 11 pages.
U.S. Appl. No. 15/478,048, Final Office Action, Sep. 17, 2021, 32 pages.
U.S. Appl. No. 16/041,552, Notice of Allowance, Sep. 30, 2021, 17 pages.
U.S. Appl. No. 16/911,154, Non-Final Office Action, Sep. 16, 2021, 15 pages.

\* cited by examiner ately to the user). Similarly, this may allow a user of such a system to provide an (unannotated) user provided digital image picturing, and to ultimately receive an estimated cost to repair such damage (also described herein as a "repair cost estimation") and/or a view of segmentation data overlaid on the user provided digital image that indicates the location of the corresponding damage.

SYSTEMS AND METHODS FOR USING MACHINE LEARNING FOR VEHICLE DAMAGE DETECTION AND REPAIR COST ESTIMATION

TECHNICAL FIELD

This application relates generally to systems for detecting vehicle damage and estimating repair costs of such damage.

BACKGROUND

Vehicles used for transporting people and goods (such as cars, trucks, vans, etc.) can become damaged (e.g., due to collisions, vandalism, acts of nature, etc.). In such cases, it may be important to understand the estimated cost of repairing such damage to the vehicle. For example, an insurance company may need to understand this estimated cost in order to determine whether to repair the damage to the vehicle or whether to total the vehicle out. In other cases, this information may be useful to a layperson with little to no experience with vehicle damage repair cost estimation to help them understand what an expected cost of repair should be (so that they can make informed decisions about having repairs done, such as, for example, verifying that a quoted cost for making a repair under consideration is reasonable).

Current methods may rely on manual and/or in-person evaluation by a person in order to come up with such repair estimates. This may involve the services of a person who is skilled in making such evaluations. However, such persons may not be readily available at all times, and/or may not be readily available to all entities who might be interested in such information in all situations (e.g., in the case where an owner of the damaged vehicle has not involved, e.g., an insurance adjuster to analyze the damage). Accordingly, it is of value to develop ways of estimating such repair costs in a manner that does not require such manual and/or in-person evaluation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
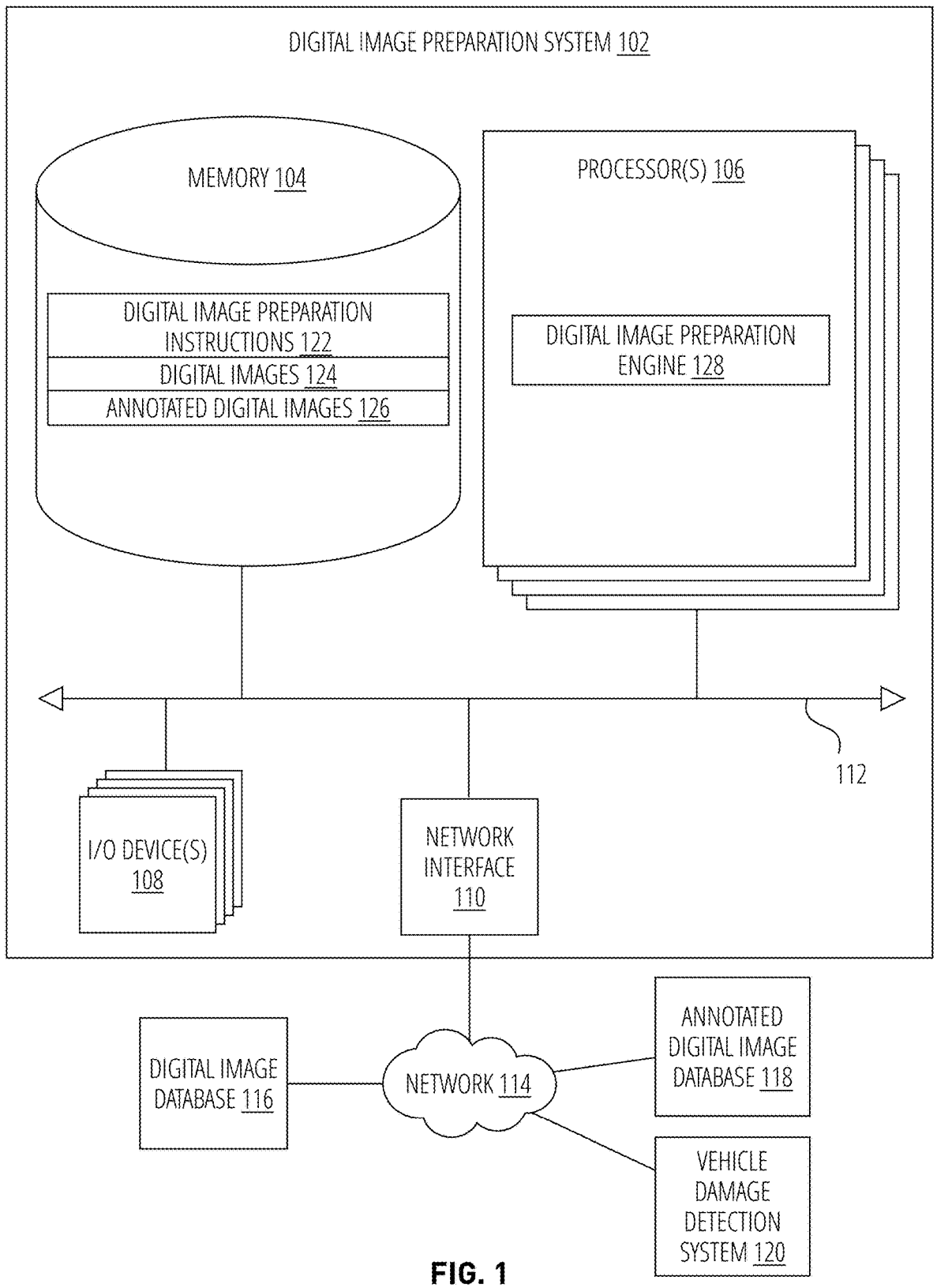
FIG. 1 illustrates an image preparation system, according to some embodiments.

Machine learning methods may be developed which can augment or replace the use of manual and/or in-person evaluations of vehicle damage repair costs. These machine learning methods may train one or more neural network (NN) models in order to generate a model corresponding to the neural network that is fit to perform a given task.

One example of such a NN model may be a damage detection NN model trained to receive one or more preprocessed digital images of vehicle damage. Such preprocessed digital images may be generated from, for example, a user provided digital image (including stills from a digital video) that might be taken for purposes of use with a system including the damage detection NN model. In some cases, these user provided digital images may be taken by a layperson using a camera that is found on a smartphone (or other device). In other cases, these user provided digital images may be taken by, for example, a camera operated by a service center computer system. Other cases are contemplated. In whatever case, these user provided digital images may be unannotated (meaning that they have not been manually marked or otherwise indicated to have one or more parameters of interest preparatory to using the image to train a damage detection NN model—as may likely be the case when receiving a user provided digital image for processing at an already-trained damage detection NN model). The damage detection NN model may be trained to process a such a user provided digital image (after preprocessing) such that one or more parameters of interest regarding vehicle damage within the user provided digital image (such as a location of the vehicle damage, one or more repair parts corresponding to the vehicle damage, a type of the vehicle damage, and/or an intensity of the vehicle damage) are identified.

Another such example of a NN model may be a repair cost estimation NN model that is trained to receive one or more parameters of interest regarding vehicle damage, such as one or more repair parts corresponding to the vehicle damage, a type of vehicle damage, and an intensity of vehicle damage. This repair cost estimation NN model may be trained to process this data such that an estimation of a cost to repair such damage is made.

The use of two such trained NN models together may allow a user of a system implementing or using such models to provide an (unannotated) user provided digital image picturing, and to ultimately receive an estimated cost to repair such damage (also described herein as a "repair cost estimation") and/or a view of segmentation data overlaid on the user provided digital image that indicates the location of the corresponding damage.

Embodiments herein discuss systems and methods for training and/or using such NN models.

It is anticipated that the application of systems leveraging these NN models may be useful in many different contexts. For example, service inspection and/or repair providers may be able to more quickly determine the nature of any damage to a vehicle and/or the cost of fixing such damage, making these service providers more efficient. As a further example, rental car companies may be able to determine the nature of damage to a vehicle both before it is rented and after it is returned in a more efficient and remote manner, allowing them to more easily integrate, for example, contactless vehicle rental methods into their business models. As a further example, vehicle insurers may be able to remotely and more quickly review damage to a vehicle and determine the cost of a claim and/or review a vehicle's current damage prior to insuring it. As a further example, laypeople that are untrained in damage analysis may use such systems to determine a reasonable expectation of the cost of making a repair under consideration.

It should be understood that such systems might provide vehicle damage and/or repair cost information via an application programming interface (API) to any consuming software system. Examples of such consuming software systems may include, for example, a vehicle repair order system (in order to capture damage of the vehicle and related estimated cost for the repair order), or a vehicle rental system (in order to, e.g., validate no damage has been done during the rental period), or any other consuming software system that the data might be useful to. These consuming software systems may be examples of "user devices" as described herein.

FIG. 1 illustrates a digital image preparation system 102, according to some embodiments. The digital image preparation system 102 may be used to annotate one or more digital images preparatory to training a damage detection NN model useful for, for example, identifying one or more parameters of interest regarding vehicle damage within a preprocessed user provided digital image (such as a location of the vehicle damage, one or more repair parts corresponding to the vehicle damage, a damage type of the vehicle damage, and/or an intensity of the vehicle damage). The digital image preparation system 102 may make further modifications (beyond annotations) to the one or more such digital images (whether before or after they are annotated) that are to be used to train the damage detection NN model, as will be described in additional detail below.

It is contemplated that the digital image preparation system 102 could be part of a larger computer-implemented system. Such a larger computer-implemented system could include, in addition to the digital image preparation system 102, one or more of, for example, a vehicle damage detection training system 302, a repair cost estimation training system 502, and/or a repair cost estimation system 702 as those systems are described herein.

The digital image preparation system 102 may include a memory 104, one or more processor(s) 106, one or more I/O device(s) 108, and a network interface 110. These elements may be connected by a data bus 112.

The I/O device(s) 108 may include devices connected to the digital image preparation system 102 that allow a user of the digital image preparation system 102 to provide input from the digital image preparation system 102 and receive output from the digital image preparation system 102. For example, these devices may include a mouse, a keyboard, speakers, a monitor, external storage, etc.

The network interface 110 may connect to a network 114 to allow the digital image preparation system 102 to communicate with outside entities, such as, for example, a digital image database 116, an annotated digital image database 118, and/or a vehicle damage detection system 120. Such communications may be performed via one or more APIs used by the digital image preparation system 102.

The memory 104 may contain digital image preparation instructions 122, which may be used by the processor(s) 106 to operate a digital image preparation engine 128. The memory 104 may further include (not yet annotated) digital images 124 (which may have been sourced from the digital image database 116) which are processed by the digital image preparation system 102, after which they become annotated digital images 126 (which may ultimately be stored at the annotated digital image database 118).

Figure 2:
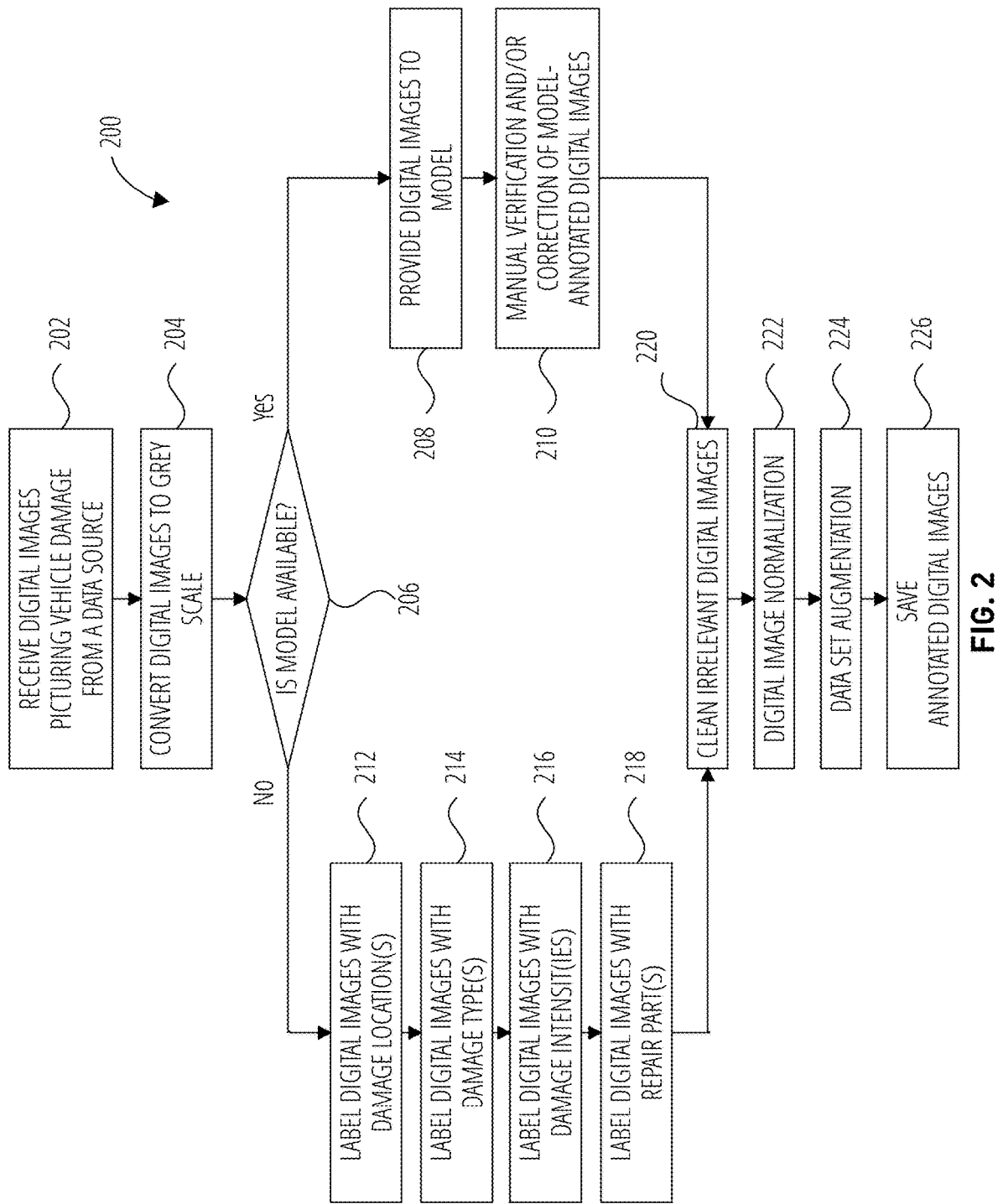
FIG. 2 illustrates a method of preparing one or more digital images prior to training a damage detection neural network (NN) model, according to an embodiment.

FIG. 2 illustrates a method 200 of preparing one or more digital images prior to training a damage detection NN model, according to an embodiment. The method 200 could be performed by, for example, the digital image preparation engine 128 of the digital image preparation system 102 of FIG. 1 (as instructed by the digital image preparation instructions 122 of FIG. 1). For convenience, the digital images being discussed in relation to the method of FIG. 2 may be referred to in the aggregate as a "set" of digital images.

The method 200 includes receiving 202 digital images picturing vehicle damage from a data source. The data source could be a memory on a device implementing the method 200, or the data source could be some data source accessible to (e.g., via a network) the device implementing the method 200 (such as, for example, the digital image database 116 of FIG. 1).

The method 200 further includes converting 204 the digital images to grey scale. This may be done prior to using the digital images in the training process so as to reduce the complexity of the analysis, in that black and white images can be represented using a single matrix, where color images may instead use multiple matrices to be represented. This may increase the training speed as compared to using color images. Converting 204 the digital images to grey scale may occur prior to annotating the digital image (see below). This may increase the accuracy of a damage detection NN model that takes as input grey scaled images (such as at least some embodiments of the damage detection NN model 320 to be described). The converting 204 the digital images to grey scale prior to training may be optional, but may be beneficial in that it leads to a decrease in the time and/or computational complexity of training the damage detection NN model.

The method 200 further includes determining 206 whether a damage detection NN model for identifying one or more parameters of interest (e.g., that are the subject of the annotation process) in an (unannotated) digital image is (already) available to the system implementing the method 200. For example, the digital image preparation engine 128 of FIG. 1 may communicate with the digital image preparation system 102 via the network interface 110 in order to determine whether the vehicle damage detection system 120 has an already trained damage detection NN model for identifying one or more of the parameters of interest (or, in the case where the digital image preparation system 102 includes the vehicle damage detection system 120, the digital image preparation system 102 may check its memory 104 for such a trained damage detection NN model). If not, the method 200 proceeds on to labeling 212 the digital images with a damage location. If so, the method 200 proceeds on to providing 208 the digital images to the model.

Labeling 212 the digital images with a damage location may be done manually (e.g., by a user of the digital image preparation system 102 using the I/O device(s) 108). The damage location may be annotated directly on the digital image in a graphical manner (e.g., using user-placed markings relative to the digital image). It is contemplated that at least some digital images may depict damage in more than one location on the vehicle. In these cases, some or all of these damage locations may be so labeled. The output of this process may be saved in annotation data corresponding to the digital image.

The method 200 then proceeds to labeling 214 the digital images with a damage type. This may be done manually (e.g., by a user of the digital image preparation system 102 using the I/O device(s) 108). The damage type used in the labeling 214 may be one of a group of pre-determined damage types for which the user is interested in training a damage detection NN model to recognize. These damage types may include (but are not limited to) a dent damage type, a scratch damage type, a smash damage type, a crack damage type, a lamp broken damage type, and a break damage type. It is contemplated that other damage types could also be used, should the user be interested in training the damage detection NN model to identify such damage types. The damage type may correspond to a labeled damage location within a digital image. In cases where digital images have more than one labeled damage location, a (potentially different) damage type may correspond to each labeled damage location. The output of this process may be saved in annotation data corresponding to the digital image.

The method 200 then proceeds to labeling 216 the digital images with a damage intensity. This may be done manually (e.g., by a user of the digital image preparation system 102 using the I/O device(s) 108). The damage intensity used in the labeling 216 may be one of a group of pre-determined damage intensities for which the user is interested in training a damage detection NN model to recognized. These damage intensities may include (but are not limited to) a minor intensity, a medium intensity, and a severe intensity. It is contemplated that other damage intensities could also be used, should the user be interested in training the damage detection NN model to identify such damage intensities. The damage intensity may correspond to a labeled damage location within a digital image. In cases where digital images have more than one labeled damage location, a (potentially different) damage intensity may correspond to each labeled damage location. The output of this process may be saved in annotation data corresponding to the digital image.

The method 200 then proceeds to labeling 218 the digital images with a repair part. This may be done manually (e.g., by a user of the digital image preparation system 102 using the I/O device(s) 108). This repair part may be a part used to effect a repair of the damaged location. In cases where digital images have more than one labeled damage location, a (potentially different) repair part may correspond to each labeled damage location. It is also anticipated that a user could specify that multiple repair parts correspond to the damage, in cases where multiple repair parts would be needed to repair such damage. The output of this process may be saved in annotation data corresponding to the digital image. The method 200 then proceeds to cleaning 220 irrelevant digital images.

Each of the labeling 212 the digital images with a damage location, the labeling 214 the digital images with a damage type, the labeling 216 the digital images with a damage intensity, and/or the labeling 218 the digital images with a repair part may be considered a form of annotation of the respective digital image. In other words, each digital image now has a set of corresponding annotation data that is to be used during the training of a damage detection NN model using the digital image. Accordingly, at this point in the method 200, it may be said that the digital images are now annotated digital images (digital images for which corresponding annotation data has been generated).

If, at determining 206, it is instead determined that a damage detection NN model for identifying one or more parameters of interest in a digital image is available, the method 200 proceeds to providing 208 the digital images to the damage detection NN model. The damage detection NN model may implement its current training to label damage location(s) and corresponding damage type(s), intensit(ies), and repair part(s) corresponding to each digital image. These labels may then be placed in annotation data corresponding to each digital image for further use during training of a damage detection NN model using each respective digital image, which may be considered a form of annotation of such digital images. Accordingly, at this point in the method 200, it may be said that the digital images are now annotated digital images.

The method 200 then proceeds to the manually verifying and/or correcting 210 of these model-annotated digital images. This may be done by a user of the digital image preparation system 102 using the I/O device(s) 108. The manually verifying and/or correcting 210 may correct any mistakes made in the annotations made by the damage detection NN model used so that the eventual training process using such the annotated digital images is more accurate. Further, if the damage detection NN model to be trained is the same as the damage detection NN model used in providing 208 the digital images to the damage detection NN model, modifications to such annotations may be made during the process of manually verifying and/or correcting 210 (or else the eventual training will simply result in the same damage detection NN model that these digital images were provided to). The method 200 then proceeds to cleaning 220 irrelevant digital images.

When cleaning 220 the irrelevant digital images, any digital image with corresponding annotation data that lacks, for example, one or more of a damage location, a damage type, a damage intensity, and/or a repair part may be removed from the set of digital images.

The method 200 further includes normalizing 222 the digital images. The normalization process may account for the fact that different digital images may have different overall ranges of values (e.g., one grey scaled digital image may have darker blacks or lighter whites than another digital image within the set). The normalization process may remove this variance from the set of digital images by causing each of values of each matrix representing the (perhaps grey scaled, as discussed above) digital image to be normalized according to a defined range (e.g., from −1 to 1). This may increase the accuracy of the eventual accuracy of a damage detection NN model that takes as input normalized images (such as at least some embodiments of the damage detection NN model 320 to be described).

The processes of converting 204 a digital image to grey scale and normalizing 222 such a digital image (whether one or both of these processes are applied) may either individually or jointly be considered a "preprocessing" (as that term is understood herein) of the digital images. Accordingly, in embodiments of the method 200 where the digital images have been normalized (and possibly grey scaled prior to normalization) at this stage, they may be considered "preprocessed digital images." In this specification, when both a grey scaling and normalization of a digital image are discussed as being performed on a (singular) "digital image" to generate a "preprocessed digital image," it may be understood that such processes are applied in step-wise fashion starting with the digital image, with an intervening image existing prior to completing the preprocessed digital image (but not explicitly discussed)).

The method 200 further includes augmenting 224 the set of digital images. The set of digital images may be augmented by taking one or more of the digital images and modifying it such that the modified digital image is also represented within the set. A digital image may be so modified by rotation, scaling, inversion, mirroring, cropping, etc. (with corresponding changes made to its corresponding annotation data). In this manner, a more robust data set for training may be generated.

During each of the cleaning 220 the irrelevant digital images, the normalizing 222 the digital images, and the augmenting 224 the set of digital images, the corresponding annotation data for each image may be accordingly protected/correspondingly modified. This may in some cases be handled by, for example, the digital image preparation system 102 of FIG. 1 without explicit input from the user.

The method 200 further includes saving 226 the annotated digital images. In other words, the preprocessed digital images along with their corresponding annotation data are saved as annotated digital images. These annotated digital images may be saved as, for example, the annotated digital images 126 in the memory 104 of the digital image preparation system 102 of FIG. 1. Alternatively or additionally, these annotated digital images may be saved in, for example, the annotated digital image database 118 of FIG. 1.

Figure 3:
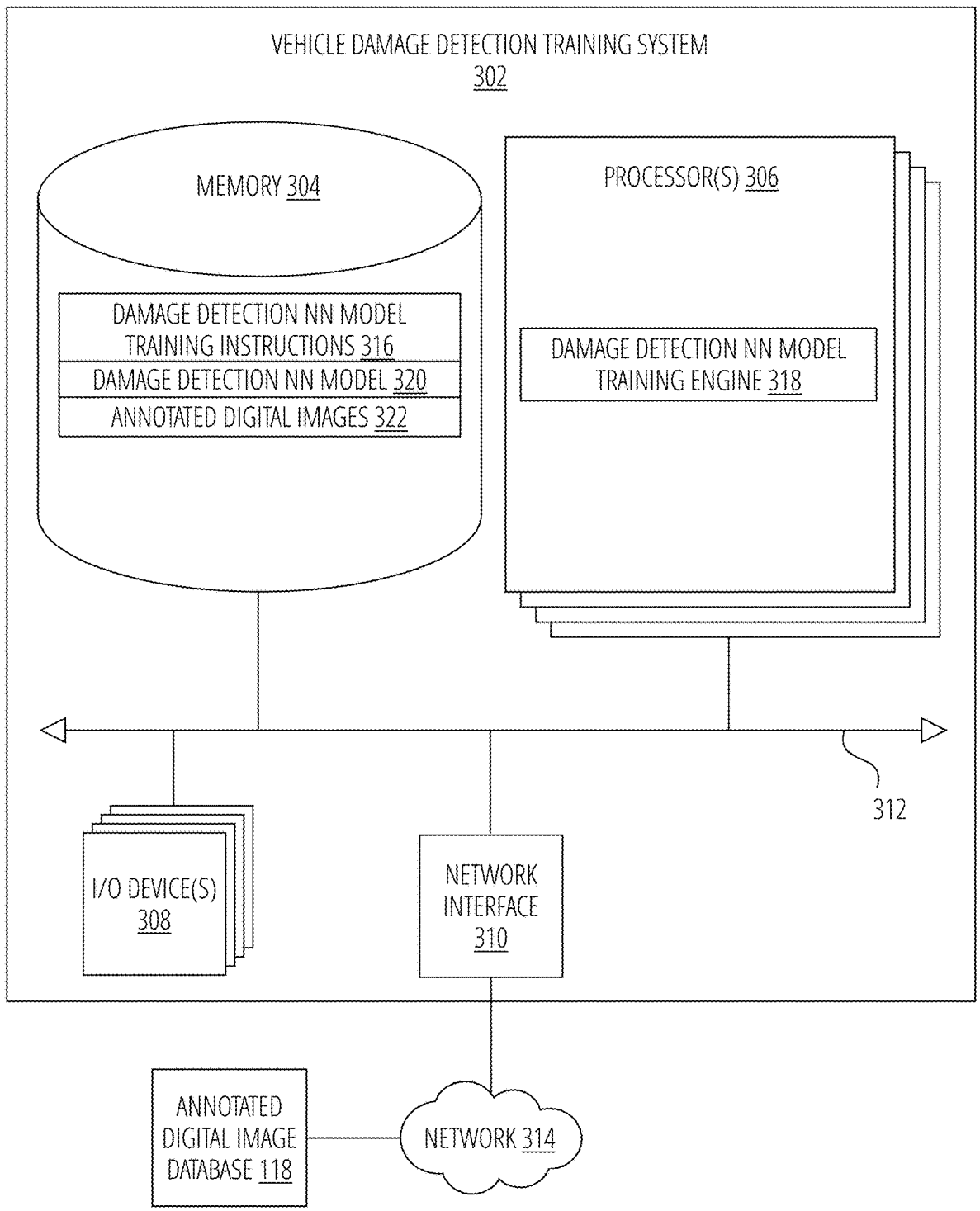
FIG. 3 illustrates a vehicle damage detection training system, according to some embodiments.

FIG. 3 illustrates a vehicle damage detection training system 302, according to some embodiments. The vehicle damage detection training system 302 may be used to train a damage detection NN model for determining a location of vehicle damage pictured in a user provided digital image, determining one or more repair parts corresponding to the vehicle damage, determining a type of the vehicle damage, and determining an intensity of the vehicle damage.

It is contemplated that the vehicle damage detection training system 302 could be part of a larger computer-implemented system. Such a larger computer-implemented system could include, in addition to the vehicle damage detection training system 302, one or more of, for example, the digital image preparation system 102, the repair cost estimation training system 502, and/or the repair cost estimation system 702 as those systems are described herein.

The vehicle damage detection training system 302 may include a memory 304, one or more processor(s) 306, one or more I/O device(s) 308, and a network interface 310. These elements may be connected by a data bus 312.

The I/O device(s) 308 may include devices connected to the vehicle damage detection training system 302 that allow a user of the vehicle damage detection training system 302 to provide input from the vehicle damage detection training system 302 and receive output from the vehicle damage detection training system 302. For example, these devices may include a mouse, a keyboard, speakers, a monitor, external storage, etc.

The network interface 310 may connect to a network 314 to allow the vehicle damage detection training system 302 to communicate with outside entities, such as, for example, the annotated digital image database 118. Such communications may be performed using one or more APIs used by the vehicle damage detection training system 302.

The memory 304 may contain damage detection NN model training instructions 316, which may be used by the processor(s) 306 to operate a damage detection NN model training engine 318. The memory 304 may further include a damage detection NN model 320, which may be a NN model that can be used to (and/or that is being trained to) determine a location of vehicle damage pictured in a user provided digital image, one or more repair parts corresponding to such vehicle damage; a type of the vehicle damage; and an intensity of the vehicle damage. The memory 304 may further include annotated digital images 322 that are being used by the vehicle damage detection training system 302 to train the damage detection NN model 320. In some embodiments, the annotated digital images 322 may have been sourced from, for example, the annotated digital image database 118.

Figure 4:
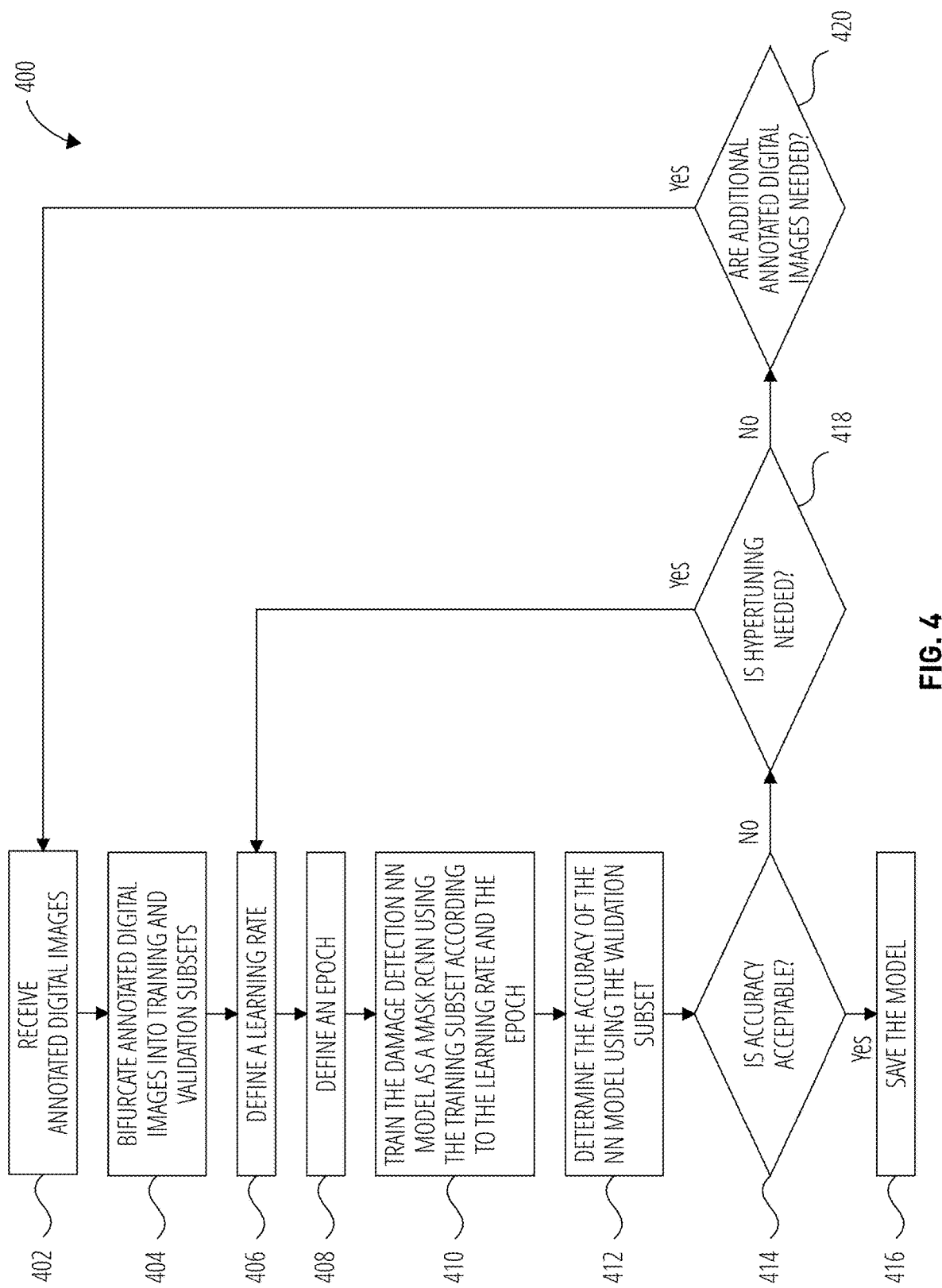
FIG. 4 illustrates a method of training a damage detection NN model, according to an embodiment.

FIG. 4 illustrates a method 400 of training a damage detection NN model, according to an embodiment. The method 400 may be performed by, for example, the damage detection NN model training engine 318 of the vehicle damage detection training system 302 (as instructed by the damage detection NN model training instructions 316 of FIG. 3). For convenience, the digital images being discussed in relation to the method of FIG. 4 may be referred to in the aggregate as a "set" of digital images.

The method 400 includes receiving 402 annotated digital images. The set of annotated digital images received may be provided from an outside source, such as, for example, the annotated digital image database 118. Annotated digital images so received could also be sourced from, for example, an image preparation system (such as the digital image preparation system 102 of FIG. 1). The set of annotated digital images may be digital images that have been normalized (and possibly grey scaled), as discussed above. The set of annotated digital images may be digital images that are annotated with labels for damage location(s) and corresponding damage type(s), intensit(ies), and repair part(s), in the manner described above.

The method 400 further includes bifurcating 404 the set of annotated digital images into a training subset and a validation subset. The training subset may be used to train a damage detection NN model, and the validation subset may be used to check against the damage detection NN model so trained in order to make a determination regarding the accuracy of the damage detection NN model.

The method 400 further includes defining 406 a learning rate for the training process. The learning rate controls the amount of adjustment that is made for one or more neurons of the damage detection NN model in relation to a calculated loss between the output of the NN model as currently arranged and the ideal result (e.g., how accurately the damage detection NN model as currently arranged can properly identify damage location(s) and corresponding damage type(s), intensit(ies), and repair part(s)). These losses may be determinable by the system by comparing the result of using an (annotated) digital image with the damage detection NN model as currently arranged and comparing the result to the annotation data corresponding to the digital image.

The method 400 further includes defining 408 an epoch for use with the training data, which indicates how many runs through the training subset are performed during the training process.

The method 400 further includes training 410 the damage detection NN model as a mask region-based convolutional neural network (mask RCNN) using the training subset according to the learning rate and the epoch. Training the damage detection NN model as a mask RCNN may have certain advantages in embodiments herein. It may be that mask RCNNs are particularly suited for detecting one or more types of objects within a digital image. During training as a mask RCNN, the damage detection NN model may be trained to recognize both the location of and one or more classifications of an object found in a digital image using the training subset of the set of annotated digital images, which contains annotated digital images showing vehicle damage and having corresponding annotation data for each of the classification variables. For instance, a damage detection NN model trained as a mask RCNN according to embodiments herein may be capable of identifying the location of vehicle damage. This information may be returned as a mask of the vehicle damage and/or a bounding box surrounding the vehicle damage (as will be illustrated in embodiments below). Further, training the damage detection NN model as a mask RCNN may allow the damage detection NN model to classify such recognized damage according to a type (e.g., scratch, smash, dent, crack, lamp broken, etc.); according to an intensity (e.g., minor, medium, or severe etc.); and according to the corresponding repair part(s) needed to repair the pictured damage.

Transfer learning may be leveraged during the training process. For example, a known NN model may already have various trained layers that can identify points, then lines, then shapes, etc., but may not have one or more final layers that can identify damage locations, types, intensities, and/or corresponding repair parts. In these cases, the layers of the (separate) known NN model for, for example, points, lines, shapes, etc., may be re-used for the current damage detection NN model, and the training process may then train these one or more final layers for making the ultimate identifications desired (e.g., locations, types, intensities, and/or corresponding repair parts). Transfer learning leveraged in this manner may save training time.

The trained damage detection NN model (e.g., the damage detection NN model 320) may accordingly receive as input a preprocessed user provided digital image (e.g., a version of a user provided digital image that has been, for example, normalized (possibly after being grey scaled, where the preprocessed image may be grey scaled in the case where the damage detection NN model was trained on grey scaled images)). The damage detection NN model then may process such an image in order to identify the location(s) of vehicle damage in the user provided digital image. The damage detection NN model may represent and/or store these locations as segmentation data that is configured to be overlaid on the user provided digital image (e.g., configured to be overlaid on the version of the user provided digital image that is not grey scaled and/or normalized). Further, the damage detection NN model may further process the preprocessed user provided digital image to identify damage type(s) corresponding to each damage location, intensit(ies) of damage corresponding to each damage location, and/or repair part(s) needed at each damage location to effectuate a repair of the identified damage.

It is anticipated that, to the extent that annotations involving multiple repair parts for a single instance of vehicle damage are available in the digital images in the training data used to train the damage detection NN model, the damage detection NN model may be able to identify multiple repair parts that correspond to a single instance of vehicle damage.

Further, the damage detection NN model may be trained on sufficient digital images such that an appropriate accuracy is reached for determining these locations, types, intensities, and repair parts without the use of a reference image of an undamaged vehicle. In other words, it is anticipated that no reference image of an undamaged vehicle is necessary to perform methods disclosed herein using a trained damage detection NN model.

The method 400 further includes determining 412 the accuracy of the model using the validation subset. Once all epochs of training data have been run through, the damage detection NN model is run with the validation subset, and an overall loss (or average loss) based on losses corresponding to each annotated digital images of the validation subset as applied to the damage detection NN model is calculated. For example, these losses may be calculated based on how accurately the damage detection NN model as currently arranged can properly identify damage location(s) and corresponding damage type(s), intensit(ies), and repair part(s) for the digital images in the validation subset, as compared to annotation data corresponding each of the annotated digital images in the validation subset. In some embodiments, a multi-task loss function is used. For example:

$$\text{Loss} = L_{cls} + L_{box} + L_{mask}, \text{ where:}$$

$L_{cls}$ is the loss according to classification(s) (e.g., damage type, intensity, and repair parts);

$L_{box}$ is the loss for predicting the bounding box(s) (e.g., corresponding to damage location(s)); and $L_{mask}$ is the loss for predicting the mask(s) (e.g., corresponding to the damage location(s)).

The method 400 further includes determining 414 whether the accuracy is acceptable. If the overall loss (or average loss) calculated in relation to the validation subset is less than (or less than or equal to) a given value, the method 400 may deem that the damage detection NN model that has been trained is sufficiently accurate, and may proceed to saving 416 the trained damage detection NN model for later use.

However, if the overall loss (or average loss) calculated in relation to the validation subset is greater than (or greater than or equal to) the given value, the method 400 instead proceeds to determining 418 whether hypertuning is needed. Hypertuning may refer to changing one or both of a learning rate and/or an epoch used by the method 400 in order to generate a different resulting trained NN model. For example, in FIG. 4, if it is determined that the such hypertuning is needed, the method 400 may return to defining 406 a learning rate so that one or more of the learning rate and/or the epoch can be modified and a new damage detection NN model can be trained.

If it is determined that hypertuning is not needed, the method 400 then concludes that additional (or new) training using additional annotated digital images may be needed in order to generate an accurate damage detection NN model. In this case, the method 400 proceeds to receiving 402 an additional and/or different set of annotated digital images such that the (now different) set may be used in conjunction with the method 400, with the hope of being able to generate a more accurate damage detection NN model with the help of this additional data.

It is contemplated that determining 418 whether hypertuning is needed and/or determining 420 that additional annotated digital images are needed to help generate a more accurate damage detection NN model could happen in any order (as both actions may be independently capable of changing/improving the output of the damage detection NN model trained by the method 400). Further, in some embodiments, it is also contemplated that perhaps only one or the other of the determining 418 whether hypertuning is needed and/or the determining 420 that additional annotated digital images are needed to help generate a more accurate damage detection NN model is performed during an iteration of the method 400.

Figure 5:
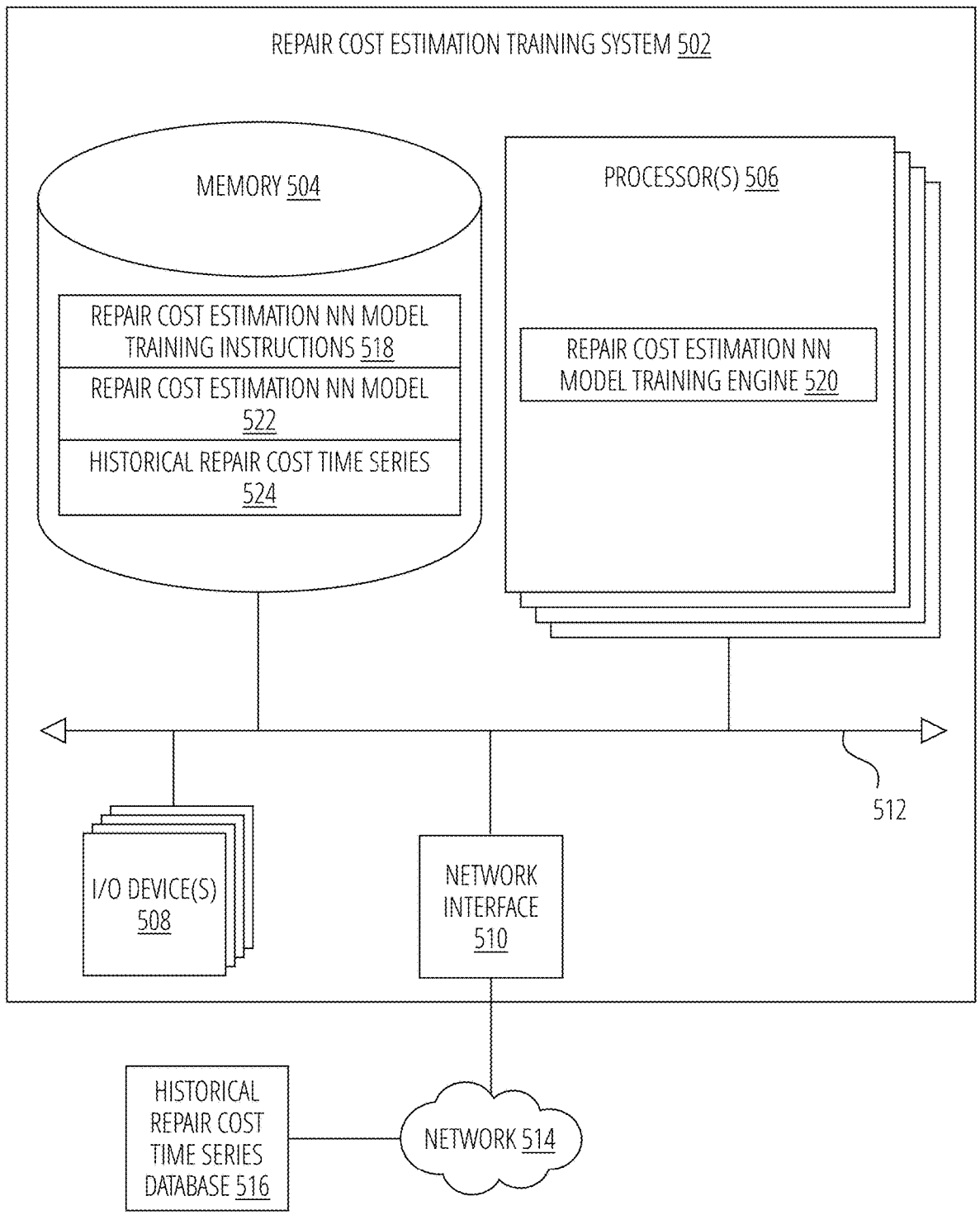
FIG. 5 illustrates a repair cost estimation training system, according to an embodiment.

FIG. 5 illustrates a repair cost estimation training system 502, according to an embodiment. The repair cost estimation training system 502 may be used to train a repair cost estimation NN model that can be used to determine an estimated cost to repair damage based on a received damage type, a received damage intensity, and one or more received repair parts to make a repair.

It is contemplated that the repair cost estimation training system 502 could be part of a larger computer-implemented system. Such a larger computer-implemented system could include, in addition to the repair cost estimation training system 502, one or more of, for example, the digital image preparation system 102, the vehicle damage detection training system 302, and/or the repair cost estimation system 702 as those systems are described herein.

The repair cost estimation training system 502 may include a memory 504, one or more processor(s) 506, one or more I/O device(s) 508, and a network interface 510. These elements may be connected by a data bus 512.

The I/O device(s) 508 may include devices connected to the repair cost estimation training system 502 that allow a user of the repair cost estimation training system 502 to provide input from the repair cost estimation training system 502 and receive output from the repair cost estimation training system 502. For example, these devices may include a mouse, a keyboard, speakers, a monitor, external storage, etc.

The network interface 510 may connect to a network 514 to allow the repair cost estimation training system 502 to communicate with outside entities, such as, for example, a historical repair cost time series database 516. Such communications may be performed using one or more APIs used by the repair cost estimation training system 502.

The memory 504 may contain a repair cost estimation NN model training instructions 518, which may be used by the processor(s) 506 to operate a repair cost estimation NN model training engine 520. The memory 504 may further include a repair cost estimation NN model 522, which may be a NN model that can be used to (e.g., that is being trained to) determine an estimated cost to repair damage based on a received damage type, a received damage intensity, and one or more received repair parts. In some embodiments, a historical repair cost time series 524 may have been sourced from, for example, the historical repair cost time series database 516.

Figure 6:
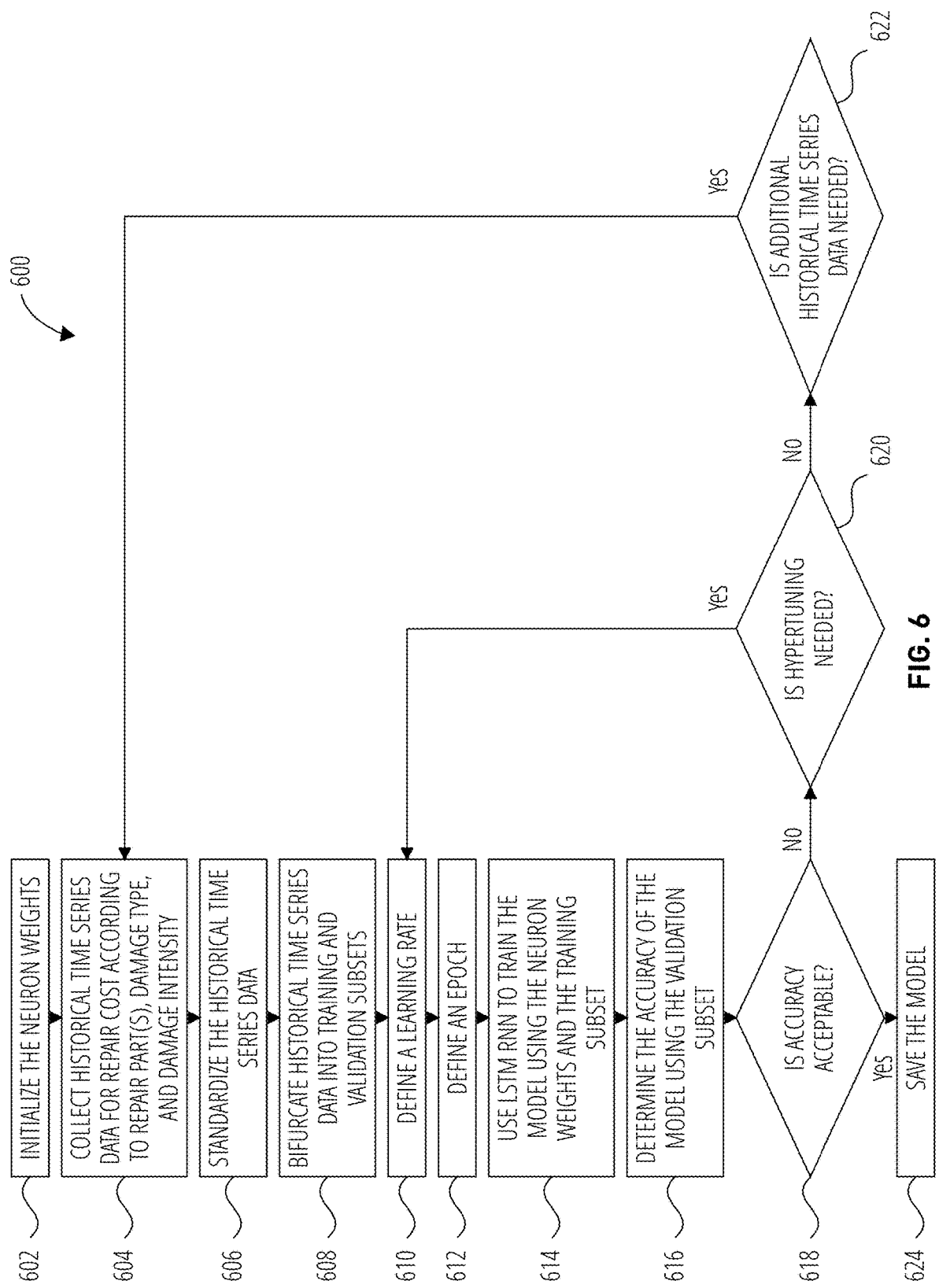
FIG. 6 illustrates a method of training a repair cost estimation NN model to determine an estimated cost to repair damage, according to an embodiment.

FIG. 6 illustrates a method 600 of training a repair cost estimation NN model to determine an estimated cost to repair damage, according to an embodiment. The method 600 may be performed by, for example, the repair cost estimation NN model training engine 520 of the repair cost estimation training system 502 (as instructed by the repair cost estimation NN model training instructions 518 of FIG. 5).

The method 600 includes initializing 602 the neuron weights within the repair cost estimation NN model that is to be trained. In transfer learning cases, these weights may be partially transferred in from another NN model.

The method 600 includes collecting 604 historical time series data for repair cost according to repair part(s), damage type, and damage intensity. The historical time series data collected may be gathered from an outside source, such as, for example, the historical repair cost time series database 516 of FIG. 5. The historical time series data may be data points that each correspond to a repair that was made to a damage vehicle that are labeled and/or ordered according to time. Each of these time-associated data points may record multiple items per data point, such as the point in time a repair was made, a damage type, a damage intensity, and repair part(s) used to repair the damage, and the cost of making the repair. The relevant time with which each data point is associated may be, for example, a date, a year, or some other record of where in an overall timeline a data point may fit.

The method 600 further includes standardizing 606 the historical time series data. Because the historical time series data points may be associated with items that do not have similar ranges (for example, an item corresponding to the cost of making a repair may have a range from 0 to 50,000 (dollars), where an item corresponding to the damage intensity may be a discrete classification system (minor, medium, severe)), it may be beneficial to standardize or normalize all of the items relative to each other, by removing the mean and scaling to unit variance. For example, each item may be translated (as necessary) to represent a numerical value (e.g., in the case of a damage intensity that uses the discrete classification system discussed above, minor may be translated to 1, middle may be translated to 2, and severe may be translated to 3). Then, the values corresponding to each item may be brought into a known range relative to the possible ranges for that item. For example, each data point for each item may be brought into the range of −1 to 1, while keeping the (relative distance between each separate data point intact). This known range (whether it be −1 to 1 or some other known range) may be the same range used for each item, which may act to simplify the training of the repair cost estimation NN model because differing ranges do not have to be accounted for within the training process.

The method 600 further includes bifurcating 608 the historical time series data into a training subset and a validation subset. The training subset may be used to train a repair cost estimation NN model, and the validation subset may be used to check against the repair cost estimation NN model so trained in order to make a determination regarding the accuracy of the repair cost estimation NN model.

The method 600 further includes defining 610 a learning rate for the training process. The learning rate controls the amount of adjustment that is made for one or more neurons of the repair cost estimation NN model in relation to a calculated loss between the output of the repair cost estimation NN model as currently arranged and the ideal result (e.g., how accurately the repair cost estimation NN model as currently arranged can properly estimate a cost of a repair). These losses may be determinable by the system by comparing the result of using a data point containing repair part(s), a damage type, and a damage intensity with the repair cost estimation NN model as currently arranged and comparing the resulting output of a repair cost to the actual repair cost associated with the data point.

The method 600 further includes defining 612 an epoch for use with the training data, which indicates how many runs through the training subset are performed during the training process.

The method 600 further includes using 614 a long short-term memory (LSTM) recurrent neural network (RNN) to train the repair cost estimation NN model using the training subset, according to the learning rate and the epoch.

Training the repair cost estimation NN model as an LSTM RNN may have certain advantages in embodiments herein. It may be that LSTM RNNs are particularly suited for predicting a result based on a input set of data with a view of analogous data collected over a previous time period. LSTM RNNs may be able to make predictions of results that account for, at least in part, variations over time within such data (and, e.g., in response to trends over time) Accordingly, during training as an LSTM RNN, the repair cost estimation NN model may be trained to make a repair cost estimation based on repair part(s) corresponding to vehicle damage, a type of the vehicle damage, and an intensity of the vehicle damage and in view of pricing trends over time using the training subset of the historical time series data, which contains this type of data for each timestamped data point. This information may be returned as textual information (as illustrated below).

In some embodiments, it is contemplated that a repair cost estimation NN model (e.g., the repair cost estimation NN model 522) can be trained to receive other types of inputs. For example, the data points of the training subset of the historical time series data may also include a geographic indication (such as city, zip code, country, county, etc.) where the repair took place. The training process may then configure the repair cost estimation NN model 522 to account for geographical location (as well) when making a repair cost estimation.

The trained repair cost estimation NN model (e.g., the repair cost estimation NN model 522) may accordingly receive as input a damage type of vehicle damage, a damage intensity of the vehicle damage, and repair part(s) used to repair the vehicle damage. The repair cost estimation NN model then may process this information and identify an estimated cost to repair the vehicle damage at the current time.

In some embodiments, it is contemplated that a repair cost estimation NN model (e.g., the repair cost estimation NN model 522) can give output corresponding to additional types of inputs. For example, the repair cost estimation NN model 522 may be trained to receive a geographic indication (as described above) such that it can further determine the estimated cost to repair damage based on a received geographic indication.

The method 600 further includes determining 616 the accuracy of the model using the validation subset. Once all epochs of training data have been run through, the repair cost estimation NN model is run with the validation subset, and an overall loss (or average loss) based on losses corresponding to each data point of the validation subset as applied to the repair cost estimation NN model is calculated. For example, these losses may be calculated based on how accurately the repair cost estimation NN model as currently arranged can properly estimate a cost of repair at the timestamped time for each data point in the validation subset using the repair part(s) corresponding to the vehicle damage, the type of the vehicle damage, and the intensity of the vehicle damage from each respective data point, as compared to the actual repair cost at that same time that is known for that data point.

The method 600 further includes determining 618 whether the accuracy is acceptable. If the overall loss (or average loss) calculated in relation to the validation subset is less than (or less than or equal to) a given value, the method 600 may deem that the repair cost estimation NN model that has been trained is sufficiently accurate, and may proceed to determining 620 the trained repair cost estimation NN model for later use.

However, if the overall loss (or average loss) calculated in relation to the validation subset is greater than (or greater than or equal to) the given value, the method 600 instead proceeds to determining 620 whether hypertuning is needed.

Hypertuning may refer to changing one or both of a learning rate and/or an epoch used by the method 600 in order to generate a different resulting trained repair cost estimation NN model. For example, in FIG. 6, if it is determined that such hypertuning is needed, the method 600 may return to defining 610 a learning rate so that one or more of the learning rate and or the epoch can be modified and a new repair cost estimation NN model can be trained.

If it is determined that hypertuning is not needed, the method 600 then concludes that additional or different historical time series data may be needed in order to generate an accurate model. In this case, the method 600 proceeds to collecting 604 (additional) historical time series data such that a larger and/or different set of such data may be used in conjunction with the method 600, with the hope of being able to generate a more accurate repair cost estimation NN model with the help of this additional data.

It is contemplated that determining 620 whether hypertuning is needed and/or determining 622 that additional historical time series data are needed to help generate a more accurate repair cost estimation NN model could happen in any order (as both actions may be independently capable of changing/improving the output of the repair cost estimation NN model trained by the method 600). Further, in some embodiments, it is also contemplated that perhaps only one or the other of determining 620 whether hypertuning is needed and/or determining 622 that additional historical time series data is needed to help generate a more accurate repair cost estimation NN model is performed during an iteration of the method 600.

Figure 7:
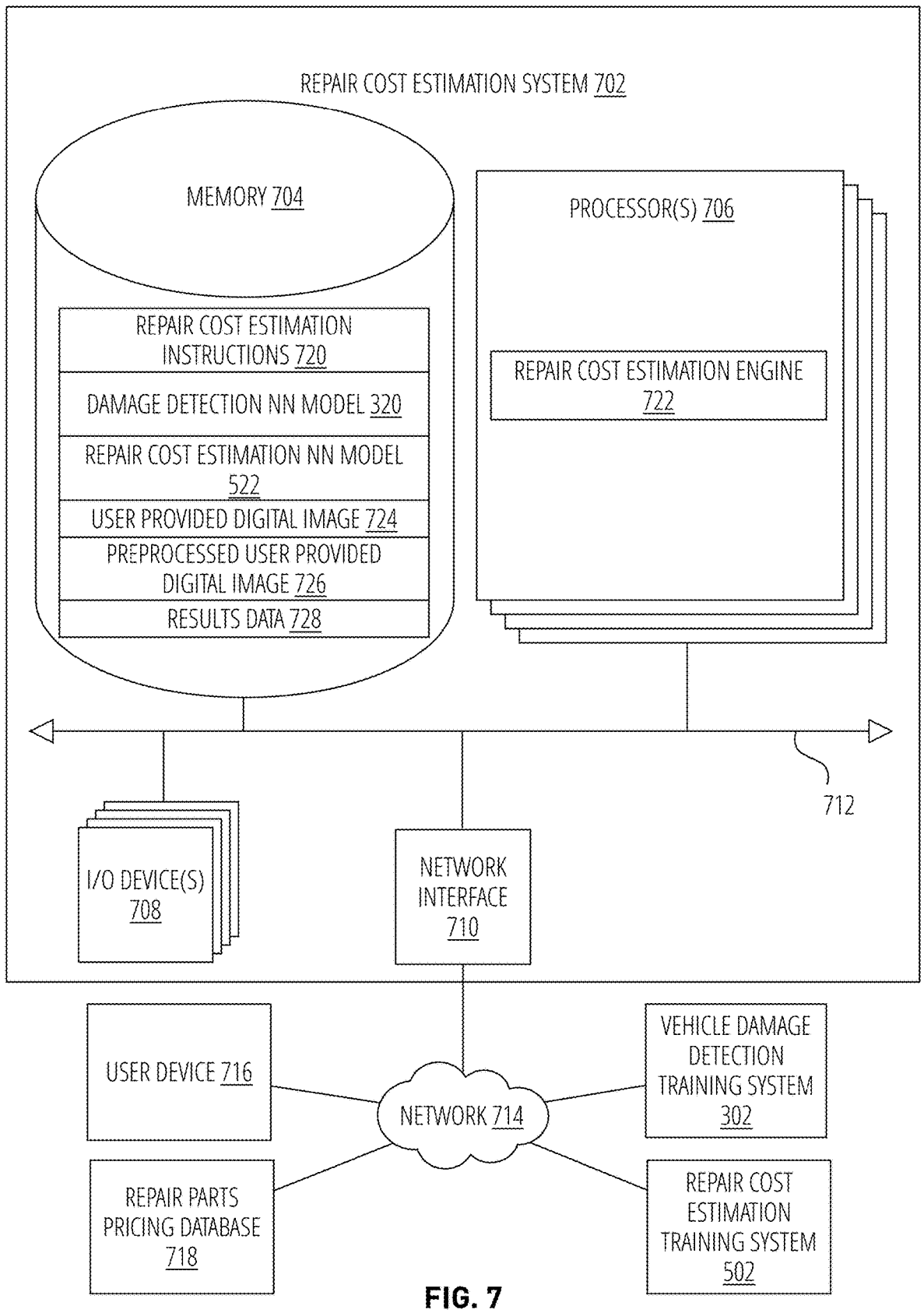
FIG. 7 illustrates a repair cost estimation system, according to an embodiment.

FIG. 7 illustrates a repair cost estimation system 702, according to an embodiment. The repair cost estimation system 702 may be used to make a repair cost estimation corresponding to damage in a user provided digital image received at the repair cost estimation system 702. Further, the repair cost estimation system 702 may be capable of overlaying segmentation data on the user provided digital image that illustrates the location of the damage in the image for which the repair cost estimation has been made.

It is contemplated that the repair cost estimation system 702 could be part of a larger computer-implemented system. Such a larger computer-implemented system could include, in addition to the repair cost estimation system 702, one or more of, for example, the digital image preparation system 102, the vehicle damage detection training system 302, and/or the repair cost estimation training system 502 as those systems are described herein.

The repair cost estimation system 702 may include a memory 704, one or more processor(s) 706, one or more I/O device(s) 708, and a network interface 710. These elements may be connected by a data bus 712.

The I/O device(s) 708 may include devices connected to the repair cost estimation system 702 that allow a user of the repair cost estimation system 702 to provide input from the repair cost estimation system 702 and receive output from the repair cost estimation system 702. For example, these devices may include a mouse, a keyboard, speakers, a monitor, external storage, etc.

The network interface 710 may connect to a network 714 to allow the repair cost estimation system 702 to communicate with outside entities, such as, for example, a user device 716, a repair parts pricing database 718, the vehicle damage detection training system 302, and/or the repair cost estimation training system 502. The repair parts pricing database 718 may be a database containing current information regarding the price(s) of one or more repair parts. The vehicle damage detection training system 302 may be, e.g., the vehicle damage detection training system 302 of FIG. 3, and the repair cost estimation training system 502 may be, e.g., the repair cost repair cost estimation training system 502 of FIG. 5. Such communications may be performed using one or more APIs used by the repair cost estimation system 702.

The memory 704 may contain repair cost estimation instructions 720, which may be used by the processor(s) 706 to operate a repair cost estimation engine 722. The memory 704 may further include the damage detection NN model 320, which may be a NN model that has been trained to identify a location of, type of, intensity of, and repair part(s) corresponding to one or more instances of pictured vehicle damage in a preprocessed user provided digital image, as described above. The damage detection NN model 320 may have been received at the repair cost estimation system 702 from the vehicle damage detection training system 302 after training at the vehicle damage detection training system 302, in the manner described above. The memory 704 may further include the repair cost estimation NN model 522 which may be a NN model that has been trained to determine an estimated cost to repair damage based on a received damage type, a received damage intensity, and received repair part(s) to make a repair, in the manner described above. This repair cost estimation NN model 522 may have been received at the repair cost estimation system 702 from the repair cost estimation training system 502 after training at the repair cost estimation training system 502, in the manner described above. The memory 704 may further include a user provided digital image 724. The user provided digital image 724 may have been received from the user device 716. The user provided digital image 724 may depict a damaged vehicle that has one or more damage locations, types, and/or intensities, in the manner described herein. The memory 704 may further include a preprocessed user provided digital image 726 that was generated by the repair cost estimation system 702 from the user provided digital image 724 using the processor(s) 706. The memory 704 may further include results data 728 that contains the results of processing at the processor(s) 706 of the preprocessed user provided digital image 726 with the damage detection NN model 320. This results data 728 may include one or more of segmentation data to be overlaid on the user provided digital image 724 indicating the location of the vehicle damage, an estimated cost to repair the vehicle damage, the type of the vehicle damage, the intensity of the vehicle damage, and/or the one or more repair part(s) corresponding to the vehicle damage.

Figure 8A:
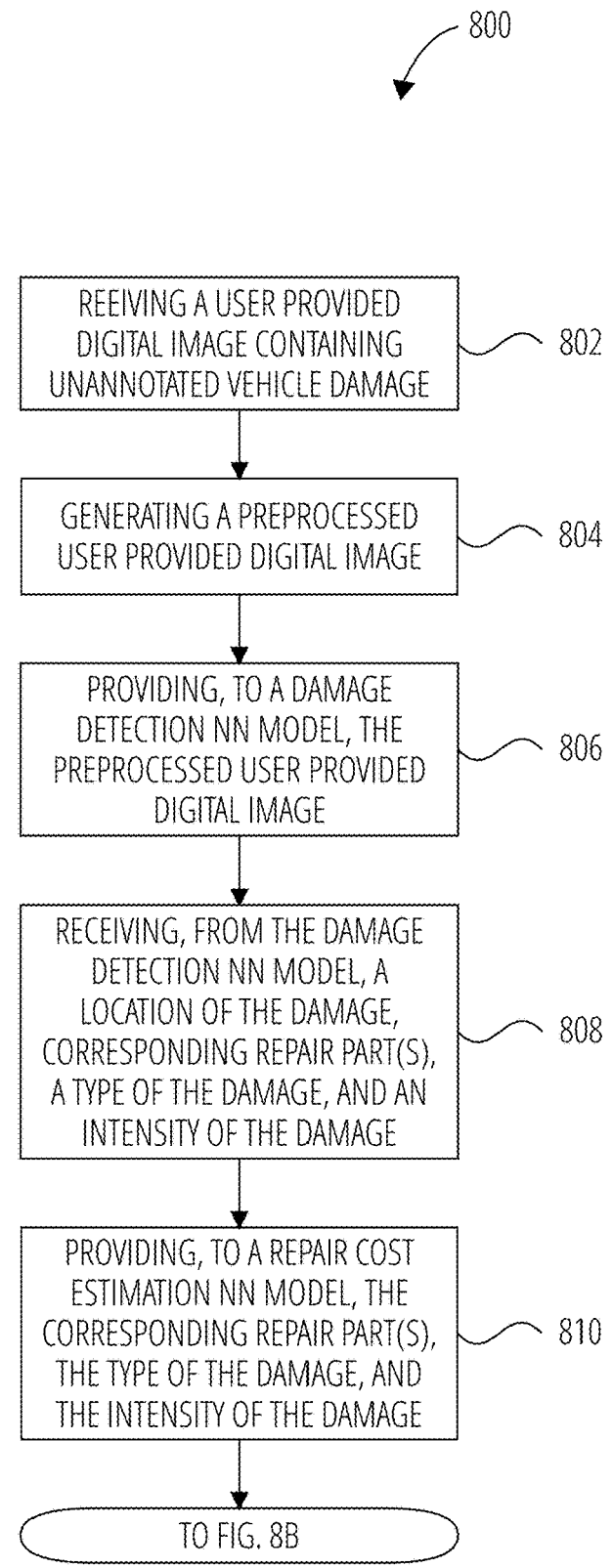
FIG. 8A and FIG. 8B together illustrate a method of making a repair cost estimation, according to an embodiment.
Figure 8B:
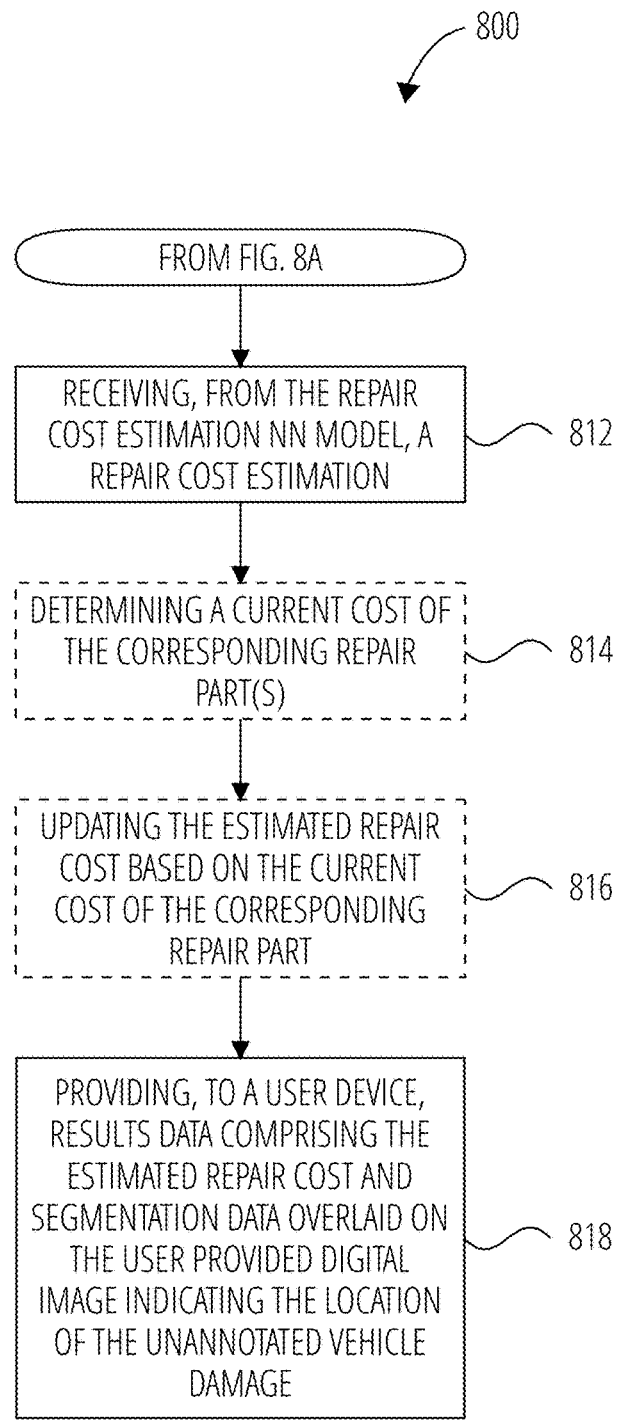

FIG. 8A illustrates a method 800 of making a repair cost estimation, according to an embodiment. The method 800 may be performed by, for example, the repair cost estimation engine 722 of the repair cost estimation system 702 (as instructed by the repair cost estimation instructions 720 of FIG. 7).

The method 800 includes receiving 802 a user provided digital image containing unannotated vehicle damage. For example, the repair cost estimation system 702 may receive such user provided digital image as the user provided digital image 724 over the network 714 from the user device 716.

The method 800 further includes generating 804 a preprocessed user provided digital image. This may be done by applying normalization to the user provided digital image. This may further be accomplished in some cases by applying grey scaling to the user provided digital image, which may allow compatibility with the damage detection NN model 320, in the case the damage detection NN model 320 was trained using grey scaled digital images, in the manner described above. This generating 804 may be performed by the processor(s) 706 using the repair cost estimation engine 722. This generating 804 may generate the preprocessed user provided digital image 726.

The method 800 further includes providing 806, to a damage detection NN model, the preprocessed user provided digital image. For example, the repair cost estimation system 702 may provide the preprocessed user provided digital image 726 to the damage detection NN model 320 for processing at the repair cost estimation system 702 (using the one or more processor(s) 706). Alternatively, the preprocessed user provided digital image 726 may be provided over the network 714 to a damage detection NN model hosted at the vehicle damage detection training system 302, which then processes the preprocessed user provided digital image 726 using the hosted damage detection NN model 320 using one or more processor(s) of the vehicle damage detection training system 302.

The method 800 further includes receiving 808, from the damage detection NN model, a location of the damage, corresponding repair part(s), a type of the damage, and an intensity of the damage. In the case of processing that occurs on the vehicle damage detection training system 302, the vehicle damage detection training system 302 returns these results to the repair cost estimation system 702. These results may represent the location of damage in the user provided digital image 724 as segmentation data that is configured to be overlaid on the user provided digital image 724. Further, these results may identify a damage type corresponding to the damage location, an intensity of the damage corresponding to the damage location, and/or one or more repair parts needed at the damage location to effectuate a repair of the identified damage. These results may be stored in the results data 728.

The method 800 further includes providing 810, to a repair cost estimation NN model, the corresponding repair part(s), the type of the damage, and the intensity of the damage. For example, the repair cost estimation system 702 may provide this information to the repair cost estimation NN model 522 for processing at the repair cost estimation system 702 (using the processor(s) 706). Alternatively, this information may be provided over the network 714 to a repair cost estimation NN model hosted at the repair cost estimation training system 502, which then processes this data using the hosted repair cost estimation NN model 522 using one or more processor(s) of the repair cost estimation training system 502. This information may be sourced from the results data 728 (as previously there stored).

The method 800 further includes receiving 812, from the repair cost estimation NN model, an estimated repair cost. This result may represent the expected or estimated total cost of repairing the unannotated vehicle damage from the user provided digital image at the present time. This result may be stored in the results data 728.

The method 800 further optionally includes determining 814 a current cost of the corresponding repair part(s). The current cost of the corresponding repair part(s) may be knowable in real time by communicating with, for example, the repair parts pricing database 718.

The method 800 further optionally includes updating 816 the estimated repair cost based on the current cost of the corresponding repair part(s). This may involve adjusting the estimated repair cost based on how well the current cost of the corresponding repair part(s) is in line with the repair cost estimation. For example, if the current cost of (any one of) the corresponding repair part(s) is determined to be much higher or lower recently (e.g., as discovered by referring again to the repair parts pricing database 718), the repair cost estimation system 702 may determine that the repair part costs that were used to train the repair cost estimation NN model used may have been somewhat out of date, and may adjust the estimated repair cost upward or downward accordingly.

The method 800 further includes providing 818, to a user device, results data comprising the estimated repair cost and segmentation data overlaid on the user provided digital image indicating the location of the unannotated vehicle damage. For example, the estimated repair cost may be an estimated repair cost predicted by the repair cost estimation NN model 522 and stored at the results data 728. The segmentation data may also be sourced from the results data 728. Then, such segmentation data is overlaid by the repair cost estimation system 702 on the user provided digital image 724. The estimated repair cost and the user provided digital image 724 overlaid with the segmentation data are then delivered to the user device 716 over the network 714.

Figure 9A:
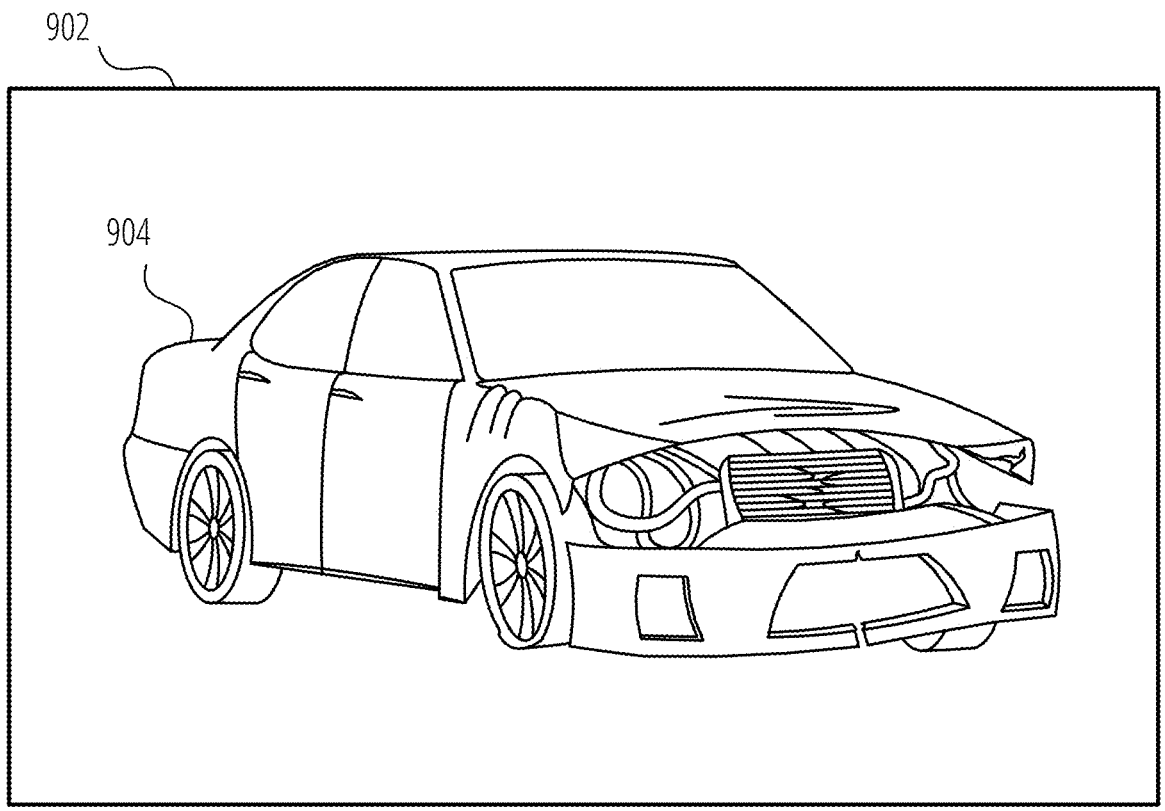
FIG. 9A illustrates a user provided digital image picturing vehicle damage, according to an embodiment.

FIG. 9A illustrates a user provided digital image 902 picturing vehicle damage, according to an embodiment. The user provided digital image 902 may be an image sent to, for example, the repair cost estimation system 702 for processing, according to an embodiment. The user provided digital image 902 as shown in FIG. 9A includes the damaged vehicle 904, with a visibly damaged front end.

Figure 9B:
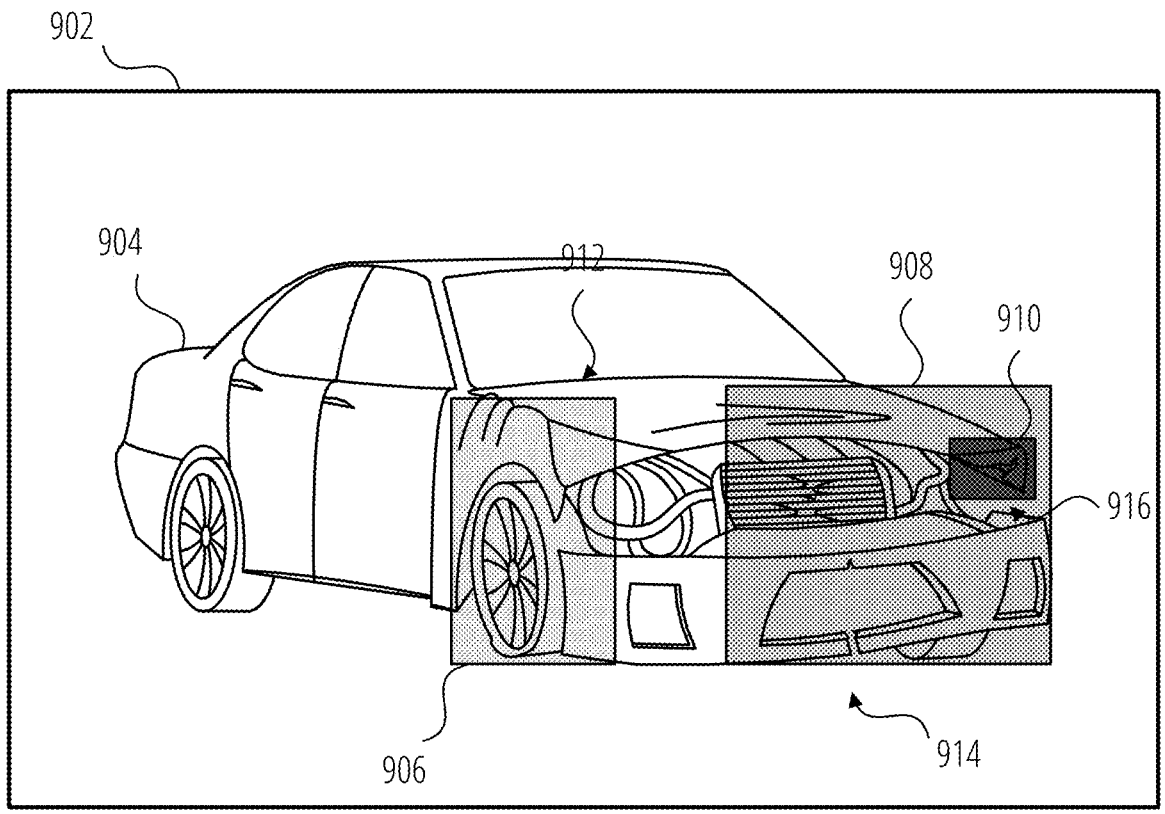
FIG. 9B illustrates a result of processing on a user provided digital image, according to an embodiment.

FIG. 9B illustrates a result of processing on the user provided digital image 902, according to an embodiment. The user provided digital image 902 may have been processed by, for example, the repair cost estimation system 702 using the processor(s) 706, in the manner described above. As a result, the damage detection NN model 320 of the repair cost estimation system 702 has identified a first vehicle damage segmentation 906 identifying the location of first vehicle damage 912, a second vehicle damage segmentation 908 identifying the location of second vehicle damage 914, and a third vehicle damage segmentation 910 identifying the location of third vehicle damage 916 for the damaged vehicle 904 of the user provided digital image 902. Each of these "vehicle damage segmentations" may be a graphical representation of "segmentation data" as described above. Further, the processing using the damage detection NN model 320 may have also determined a type, a location, and corresponding repair part(s) for each of the first vehicle damage 912 (represented by the first vehicle damage segmentation 906), the second vehicle damage 914 (represented by the second vehicle damage segmentation 908), and the third vehicle damage 916 (represented by the third vehicle damage segmentation 910). For each of the first vehicle damage 912, the second vehicle damage 914, and the third vehicle damage 916, the segmentation data indicating the location of the damage, the damage type, the damage intensity, and the corresponding repair part(s) may be saved in, for example, the memory 704 of the repair cost estimation system 702 (e.g., as the results data 728).

Figure 10:
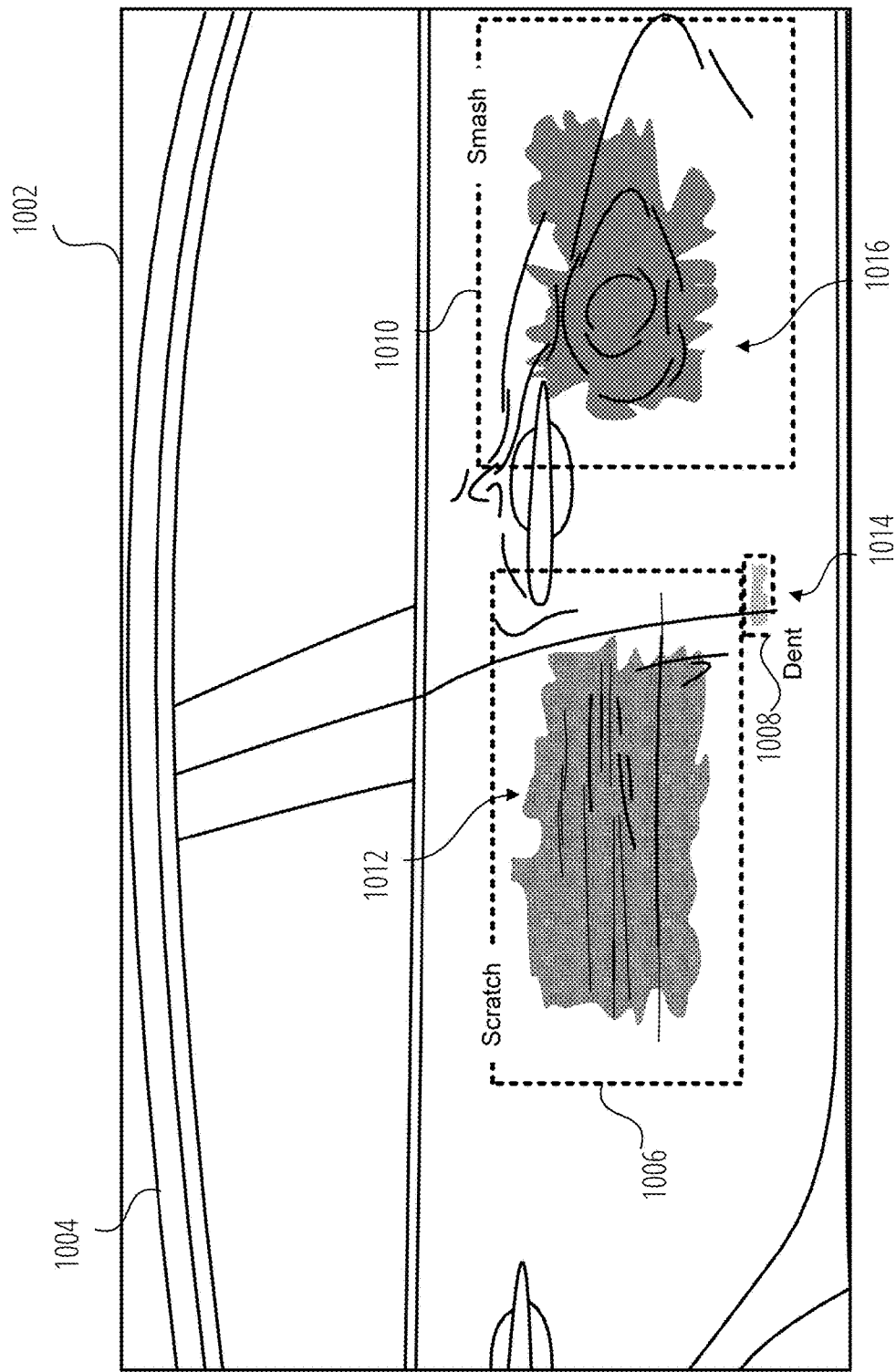
FIG. 10 illustrates a user provided digital image of a damaged vehicle that illustrates the overlay of a first vehicle damage segmentation, a second vehicle damage segmentation, and a third vehicle damage segmentation on the user provided digital image, according to an embodiment.

FIG. 10 illustrates a user provided digital image 1002 of a damaged vehicle 1004 that illustrates the overlay of a first vehicle damage segmentation 1006, a second vehicle damage segmentation 1008, and a third vehicle damage segmentation 1010 on the user provided digital image 1002, according to an embodiment. The user provided digital image 1002 may have been provided by the user as showing first vehicle damage 1012, second vehicle damage 1014, and third vehicle damage 1016 to the repair cost estimation system 702, but that did not include the first vehicle damage segmentation 1006, the second vehicle damage segmentation 1008, and/or the third vehicle damage segmentation 1010. As illustrated, it is not necessarily a requirement that a user provided digital image such as the user provided digital image 1002 provided to the repair cost estimation system 702 include the entire vehicle. The user provided digital image 1002 with the first vehicle damage segmentation 1006, the second vehicle damage segmentation 1008, and/or the third vehicle damage segmentation 1010 may be one form of results data generated by a repair cost estimation system 702 and provided to (and displayed on) a user device 716 in response to receiving the user provided digital image 1002 from the user device 716. Each of these "vehicle damage segmentations" may be a graphical representation of "segmentation data" as described above.

As shown, first vehicle damage segmentation 1006 may illustrate the location of the first vehicle damage 1012, the second vehicle damage segmentation 1008 may illustrate the location of the second vehicle damage 1014, and the third vehicle damage segmentation 1010 may illustrate the location of third vehicle damage 1016. These illustrations may be shown by using the illustrated bounding boxes and/or masks showing the location of the respective identified damage. Further, as illustrated, each of these bounding boxes may include for display a textual representation of a damage type corresponding to the damage pictured. Additional and/or alternative textual representations may be similarly made, as discussed in further detail below.

Further, the first vehicle damage 1012, the second vehicle damage 1014, and the third vehicle damage 1016 may have each been independently identified by the repair cost estimation system 702 as being of one of various possible damage types. For example, the first vehicle damage 1012 may have been identified by the repair cost estimation system 702 as a scratch damage type, the second vehicle damage 1014 may have been identified by the repair cost estimation system 702 as a dent damage type, and the third vehicle damage 1016 may have been identified by the repair cost estimation system 702 as a smash damage type. As illustrated, these types may respectively be displayed textually in, for example, the first vehicle damage segmentation 1006, the second vehicle damage segmentation 1008, and the third vehicle damage segmentation 1010.

Further, the first vehicle damage 1012, the second vehicle damage 1014, and the third vehicle damage 1016 may have each been independently identified by the repair cost estimation system 702 as being of various possible damage intensities. For example, the first vehicle damage 1012 may have been identified as of a severe damage intensity, the second vehicle damage 1014 may have been identified by the repair cost estimation system 702 as of a minor damage intensity, and the third vehicle damage 1016 may have been identified by the repair cost estimation system 702 as of a severe damage intensity. While not illustrated, it is contemplated that these intensities may respectively be displayed textually in, for example, the first vehicle damage segmentation 1006, the second vehicle damage segmentation 1008, and the third vehicle damage segmentation 1010.

Various (and potentially different) repair parts may have been identified by the repair cost estimation system 702 as corresponding to the first vehicle damage 1012, the second vehicle damage 1014, and the third vehicle damage 1016. For example, a "rear passenger door" repair part may have been identified to correspond to the first vehicle damage 1012, a "none" repair part may have been identified to correspond to the second vehicle damage 1014 (meaning that the repair can be done without a repair part), and a "front passenger door" repair part may have been identified to correspond to the third vehicle damage 1016. It is further anticipated that, to the extent that data involving multiple repair parts for a single instance of vehicle damage is available in the training data used to train the damage detection NN model 320, the repair cost estimation system 702 may be able to identify multiple repair parts that correspond to one of the first vehicle damage 1012, the second vehicle damage 1014, and/or the third vehicle damage 1016. For example, in addition to the "front passenger door" part, a "front passenger window mechanism" may also be identified as corresponding to the third vehicle damage 1016. While not illustrated, it is contemplated that these repair parts may respectively be displayed textually in, for example, the first vehicle damage segmentation 1006, the second vehicle damage segmentation 1008, and the third vehicle damage segmentation 1010.

Once identified, the damage type, the damage intensity, and the corresponding repair part(s) for one or more of the first vehicle damage 1012, the second vehicle damage 1014, and/or the third vehicle damage 1016 may be processed with the repair cost estimation NN model 522 in order to generate a repair cost estimation for one (or more) of these. This repair cost estimation may also be an example of results data that is sent to and displayed on the user device 716. While not illustrated, it is contemplated that the repair cost estimations may respectively be displayed textually in, for example, the first vehicle damage segmentation 1006, the second vehicle damage segmentation 1008, and the third vehicle damage segmentation 1010.

It is further contemplated that the damage type, the damage intensity, and the corresponding repair part(s) for each of these could also be sent to (and displayed on) the user device 716 as results data.

Figure 11:
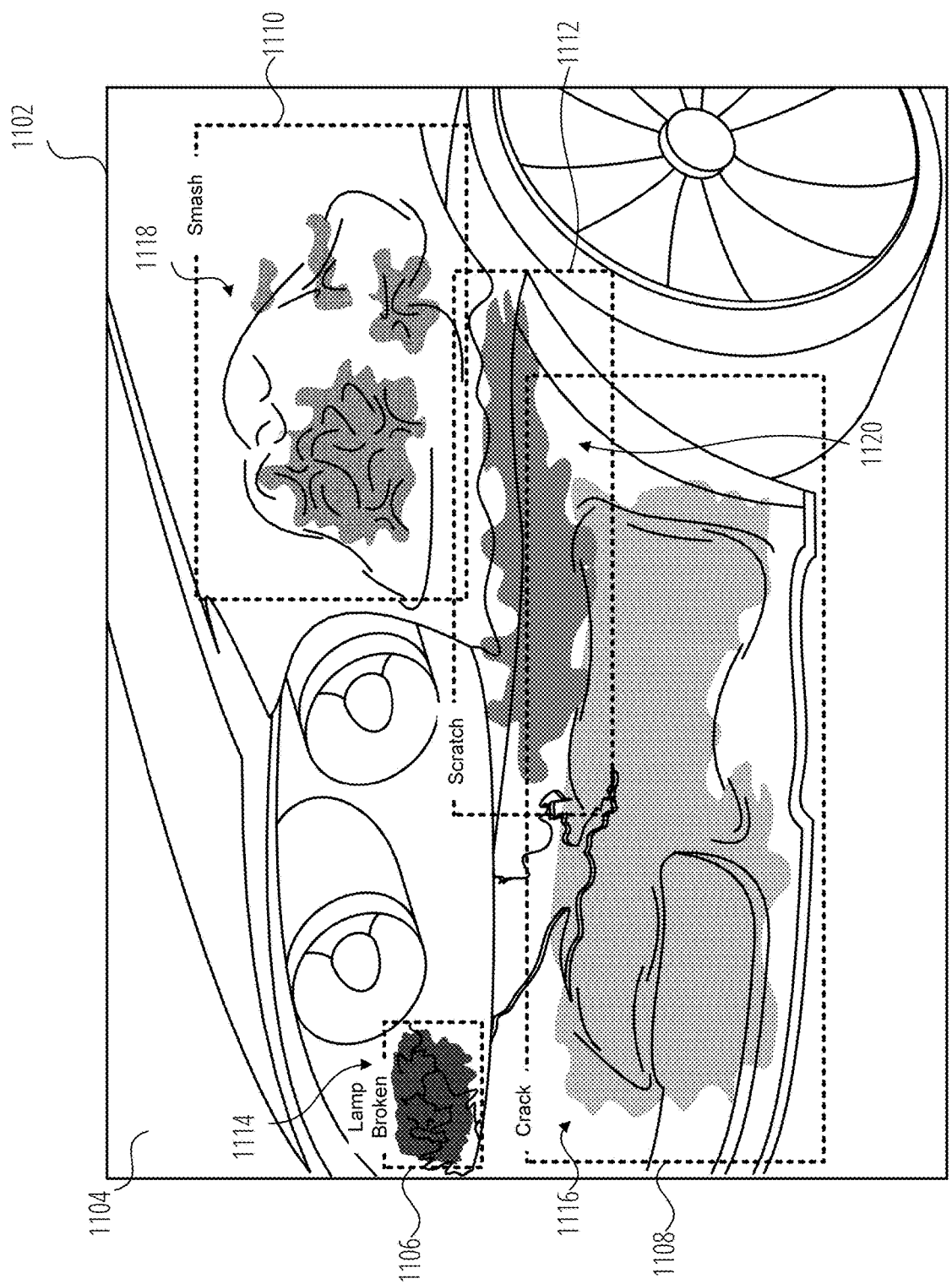
FIG. 11 illustrates a user provided digital image of a damaged damage vehicle that illustrates the overlay of a first vehicle damage segmentation, a second vehicle damage segmentation, a third vehicle damage segmentation, and a fourth vehicle damage segmentation on the user provided digital image, according to an embodiment.

FIG. 11 illustrates a user provided digital image 1102 of a damaged damage vehicle 1104 that illustrates the overlay of a first vehicle damage segmentation 1106, a second vehicle damage segmentation 1108, a third vehicle damage segmentation 1110, and a fourth vehicle damage segmentation 1112 on the user provided digital image 1102, according to an embodiment. The user provided digital image 1102 may have been provided by the user as showing first vehicle damage 1114, second vehicle damage 1116, third vehicle damage 1118, and fourth vehicle damage 1120 to the repair cost estimation system 702, but that did not include the first vehicle damage segmentation 1106, the second vehicle damage segmentation 1108, the third vehicle damage segmentation 1110, or the fourth vehicle damage segmentation 1112. As illustrated, it is not necessarily a requirement that a user provided digital image such as the user provided digital image 1102 provided to the repair cost estimation system 702 include the entire vehicle. The user provided digital image 1102 with the first vehicle damage segmentation 1106, the second vehicle damage segmentation 1108, the third vehicle damage segmentation 1110, and/or the fourth vehicle damage segmentation 1112 may be one form of results data generated by a repair cost estimation system 702 and provided to (and displayed on) a user device 716 in response to receiving the user provided digital image 1102 from the user device 716. Each of these "vehicle damage segmentations" may be a graphical representation of "segmentation data" as described above.

As shown, first vehicle damage segmentation 1106 may illustrate the location of the first vehicle damage 1114, the second vehicle damage segmentation 1108 may illustrate the location of the second vehicle damage 1116, the third vehicle damage segmentation 1110 may illustrate the location of the third vehicle damage 1118, and the fourth vehicle damage segmentation 1112 may illustrate the location of the fourth vehicle damage 1120. These illustrations may be shown by using the illustrated bounding boxes and/or masks showing the location of the respective identified damage. Further, as illustrated, each of these bounding boxes may include for display a textual representation of a damage type corresponding to the damage pictured. Additional and/or alternative textual representations may be similarly made, as discussed in further detail below.

Further, the first vehicle damage 1114, the second vehicle damage 1116, the third vehicle damage 1118, and the fourth vehicle damage 1120 may have each been independently identified by the repair cost estimation system 702 as being of one of various possible damage types. For example, the first vehicle damage 1114 may have been identified by the repair cost estimation system 702 as a lamp broken damage type, the second vehicle damage 1116 may have been identified by the repair cost estimation system 702 as a crack damage type, the third vehicle damage 1118 may have been identified by the repair cost estimation system 702 as a smash damage type, and the fourth vehicle damage 1120 may have been identified by the repair cost estimation system 702 as a scratch damage type. As illustrated, these types may respectively be displayed textually in, for example, the first vehicle damage segmentation 1106, the second vehicle damage segmentation 1108, the third vehicle damage segmentation 1110, and the fourth vehicle damage segmentation 1112.

Further, the first vehicle damage 1114, the second vehicle damage 1116, the third vehicle damage 1118, and the fourth vehicle damage 1120 may have each been independently identified by the repair cost estimation system 702 as being of various possible damage intensities. For example, the first vehicle damage 1114 may have been identified as of a medium damage intensity, the second vehicle damage 1116 may have been identified by the repair cost estimation system 702 as of a severe damage intensity, the third vehicle damage 1118 may have been identified by the repair cost estimation system 702 as of a severe damage intensity, and the fourth vehicle damage 1120 may have been identified by the repair cost estimation system 702 as of a medium damage intensity. While not illustrated, it is contemplated that these intensities may respectively be displayed textually in, for example, the first vehicle damage segmentation 1106, the second vehicle damage segmentation 1108, the third vehicle damage segmentation 1110, and the fourth vehicle damage segmentation 1112.

Various (and potentially different) repair parts may have been identified by the repair cost estimation system 702 as corresponding to the first vehicle damage 1114, the second vehicle damage 1116, the third vehicle damage 1118, and the fourth vehicle damage 1120. For example, a "front driver headlamp" repair part may have been identified to correspond to the first vehicle damage 1114, a "front bumper" repair part may have been identified to correspond to the second vehicle damage 1116, a "front driver side panel" repair part may have been identified to correspond to the third vehicle damage 1118, and a "front driver side panel" repair part may have been identified to correspond to the fourth vehicle damage 1120. It is further anticipated that, to the extent that data involving multiple repair parts for a single instance of vehicle damage is available in the training data used to train the damage detection NN model 320, the repair cost estimation system 702 may be able to identify multiple repair parts that correspond to one of the first vehicle damage 1114, the second vehicle damage 1116, the third vehicle damage 1118, and/or the fourth vehicle damage 1120. For example, in addition to the identification of the "front bumper" repair part, a "radiator" repair part may also be identified as corresponding to the second vehicle damage 1116. While not illustrated, it is contemplated that these repair parts may respectively be displayed textually in, for example, the first vehicle damage segmentation 1106, the second third vehicle damage segmentation 1110, the third vehicle damage segmentation 1110, and the fourth vehicle damage segmentation 1112.

Once identified, the damage type, the damage intensity, and the corresponding repair part(s) for one or more of the first vehicle damage 1114, the second vehicle damage 1116, the third vehicle damage 1118, and/or the fourth vehicle damage 1120 may be processed with the repair cost estimation NN model 522 in order to generate a repair cost estimation for one (or more) of these. This repair cost estimation may also be an example of results data that is sent to and displayed on the user device 716. It is further contemplated that the damage type, the damage intensity, and the corresponding repair part(s) for each of these could also be sent to (and displayed on) the user device 716 as results data.

Figure 12:
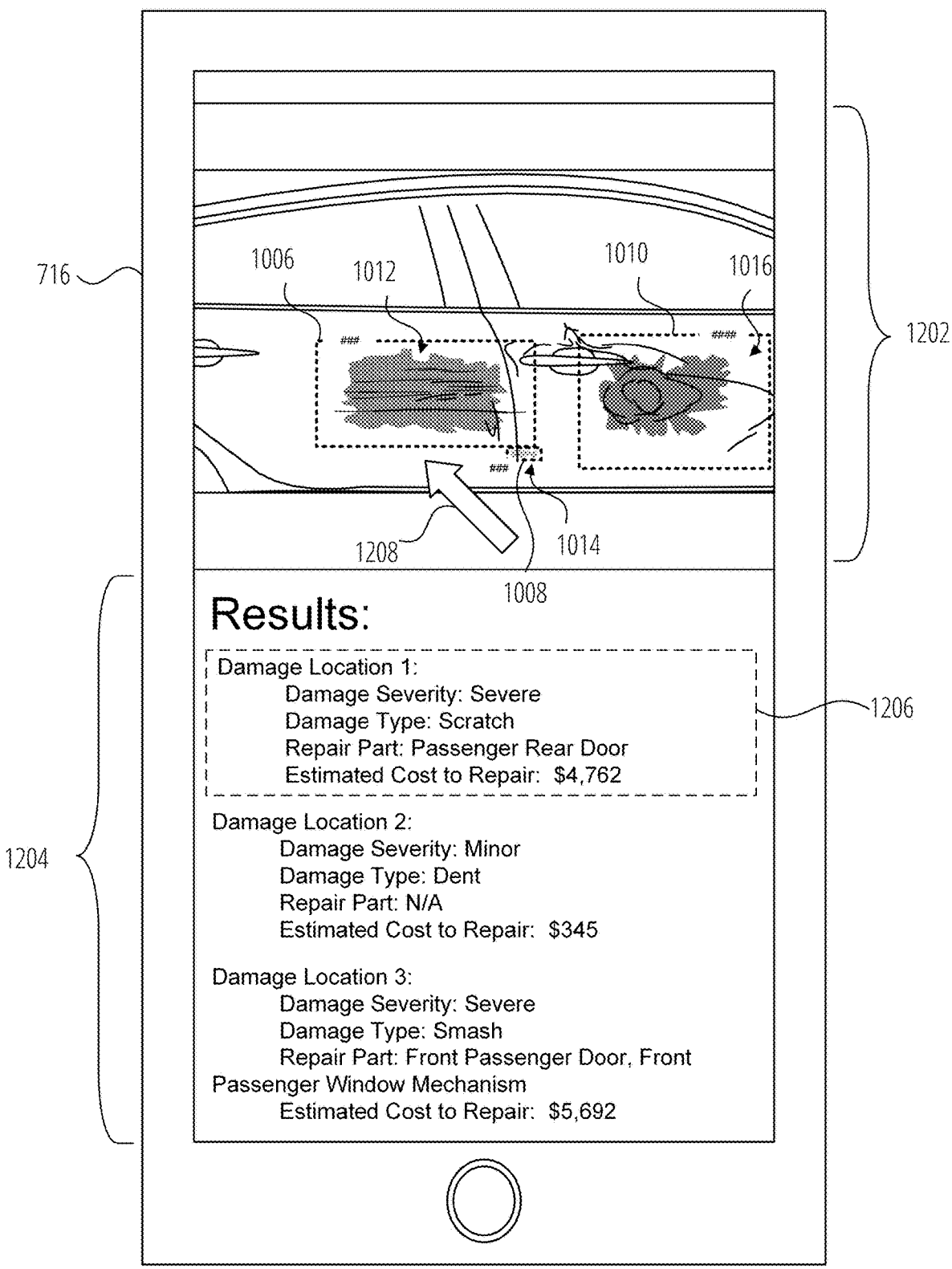
FIG. 12 illustrates a user device displaying results data, according to an embodiment.

FIG. 12 illustrates a user device 716 displaying results data, according to an embodiment. While the user device 716 of FIG. 12 has been illustrated as a smartphone, it is contemplated that any other types of suitable user devices such as, for example, personal computers, tablet computers, etc., may be used as "user devices" as described herein.

The user device 716 may display some of the results data in a display region 1202. The results data shown in the display region 1202 may include the user provided digital image 1002 that was provided to the repair cost estimation system 702 as described in relation to FIG. 10, including the first vehicle damage 1012, the second vehicle damage 1014, and the third vehicle damage 1016. The results data shown in the display region 1202 may further include the first vehicle damage segmentation 1006, the second vehicle damage segmentation 1008, and the third vehicle damage segmentation 1010 (including any textual matter as describe above therein, as illustrated (but not legible) in the first vehicle damage segmentation 1006, the second vehicle damage segmentation 1008, and the first vehicle damage 1012 reproduced in the display region 1202) overlaid on the user provided digital image 1002, in the manner described above.

The user device 716 may display some of the results data in a textual information region 1204. In the example of FIG. 7, the user has made a selection 1206 of textual data corresponding to the first vehicle damage 1012, causing an indicator 1208 to appear on the screen to indicate the first vehicle damage 1012. The results data in the textual information region 1204 includes an estimated cost to repair the first vehicle damage 1012. Further, as illustrated, the results data in the textual information region 1204 also includes the intensity of the first vehicle damage 1012, the type of the first vehicle damage 1012, and the corresponding repair part for the first vehicle damage 1012.

Textual information region 1204 may also include textual information for the second vehicle damage 1014 and the third vehicle damage 1016, and a user may cause an indicator similar to the indicator 1208 to appear in relation to either of these within the display region 1202 by making a selection of the associated corresponding textual information.

The foregoing specification has been described with reference to various embodiments, including the best mode. However, those skilled in the art appreciate that various modifications and changes can be made without departing from the scope of the present disclosure and the underlying principles of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus.

Embodiments herein may include various engines, which may be embodied in machine-executable instructions to be executed by a general-purpose or special-purpose computer (or other electronic device). Alternatively, the engine functionality may be performed by hardware components that include specific logic for performing the function(s) of the engines, or by a combination of hardware, software, and/or firmware.

Principles of the present disclosure may be reflected in a computer program product on a tangible computer-readable storage medium having stored instructions thereon that may be used to program a computer (or other electronic device) to perform processes described herein. Any suitable computer-readable storage medium may be utilized, including magnetic storage devices (hard disks, floppy disks, and the like), optical storage devices (CD-ROMs, DVDs, Blu-Ray discs, and the like), flash memory, and/or other types of medium/machine readable medium suitable for storing electronic instructions. These instructions may be loaded onto a general purpose computer, special purpose computer, or other programmable data processing apparatus to produce a machine, such that the instructions that execute on the computer or other programmable data processing apparatus create means for implementing the functions specified. These instructions may also be stored in a computer-readable memory that can direct a computer or other programmable data processing apparatus to function in a particular manner, such that the instructions stored in the computer-readable memory produce an article of manufacture including instruction means which implement the function specified. The instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the disclosed embodiments is readily provided by those of skill in the pertinent art(s) using the teachings presented here and programming languages and tools, such as Java, JavaScript, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and MacOS. Alternatively, it is expected that future embodiments will be adapted to execute on other future operating systems.

It will be obvious to those having skill in the art that many changes may be made to the details of the above-described embodiments without departing from the underlying principles of the disclosed embodiments.

What is claimed is:

1. A computer-implemented method of training a vehicle damage detection neural network model, comprising:
    collecting a set of annotated digital images from a database, each annotated digital image comprising one or more annotations each corresponding to vehicle damage pictured in the annotated digital image, each annotation comprising:
        a location of the vehicle damage pictured in the annotated digital image;
        a repair part corresponding to the vehicle damage pictured in the annotated digital image;
        a type of the vehicle damage pictured in the annotated digital image; and
        an intensity of the vehicle damage pictured in the annotated digital image;
    converting the set of annotated digital images to annotated greyscale digital images;
    bifurcating the set of annotated greyscale digital images into a training subset and a validation subset;
    training the vehicle damage detection neural network model using the training subset, wherein after said training the vehicle damage detection neural network model is trained to, without the use of a reference image of an undamaged vehicle, for a preprocessed user provided digital image picturing vehicle damage:
        determine a location of the vehicle damage pictured in the user provided digital image;
        determine a repair part corresponding to the vehicle damage pictured in the user provided digital image;
        determine a type of the vehicle damage pictured in the user provided digital image; and
        determine an intensity of the vehicle damage pictured in the user provided digital image; and
    determining an accuracy of the vehicle damage detection neural network model using the validation subset based, at least in part, on losses determined based on the one or more annotations.

2. The computer-implemented method of claim 1, wherein the type of the vehicle damage pictured in the annotated digital image comprises one or more of a dent, a scratch, a smash, and a break.

3. The computer-implemented method of claim 1, wherein the intensity of the vehicle damage pictured in the annotated digital image comprises one or more of minor and severe.

4. The computer-implemented method of claim 1, further comprising normalizing each annotated digital image of the set of annotated digital images prior to bifurcating the set of annotated digital images.

5. The computer-implemented method of claim 1, further comprising augmenting the set of annotated greyscale digital images by modifying one or more of the annotated greyscale digital images and adding the one or more modified annotated greyscale digital images to the set of annotated greyscale digital images.

6. The computer-implemented method of claim 1, wherein determining the accuracy of the vehicle damage detection neural network model using the validation subset comprises determining an overall loss based on the losses corresponding to each annotated greyscale digital image of the validation subset applied to the damage detection neural network model.

7. The computer-implemented method of claim 1, wherein the vehicle damage detection neural network model comprises a mask RCNN.

8. A computer-implemented method of training a repair cost estimation neural network model, comprising:
    collecting a set of historical data for damaged vehicles, each data point in the set comprising a damage type, a damage intensity, a used repair part, and a repair cost;
    bifurcating the set of historical data into a training subset and a validation subset;
    converting images picturing vehicle damage to greyscale digital images, each data point in the set corresponding to a respective greyscale digital image;
    training the repair cost estimation neural network model using the training subset and the grayscale digital images, wherein after said training the repair cost estimation neural network model is trained to determine an estimated cost to repair vehicle damage based on a received digital image picturing the vehicle damage or on a received damage type, a received damage intensity, and a received repair part to make a repair; and
    determining an accuracy of the repair cost estimation neural network model using the validation subset based, at least in part, on losses determined based on the one or more annotations.

9. The computer-implemented method of claim 8, wherein the damage type of each data point in the set of historical data comprises one or more of a dent, a scratch, a smash, and a break.

10. The computer-implemented method of claim 8, wherein the damage intensity of each data point in the set of historical data comprises one or more of minor and severe.

11. The computer-implemented method of claim 8, further comprising standardizing the set of historical data by scaling to unit variance.

12. The computer-implemented method of claim 8, wherein the repair cost estimation neural network model comprises an LSTM RNN.

13. The computer-implemented method of claim 8, further comprising defining a learning rate for training the repair cost estimation neural network model.

14. The computer-implemented method of claim 8, wherein each item in the set of historical data further comprises a geographic indication; and wherein after said training the repair cost estimation neural network model can further determine the estimated cost to repair damage based on a received geographic indication.

15. A computer-implemented method for providing vehicle repair information to a user device, comprising:
   receiving, from the user device, a user provided digital image of a vehicle that pictures vehicle damage of the vehicle;
   generating a preprocessed user provided digital image from the user provided digital image;
   providing, to a damage detection neural network model trained with a training subset of grayscale images picturing vehicle damage and verified for accuracy with a validation subset of the grayscale images picturing the vehicle damage based on losses determined based, at least partially, on one or more annotations corresponding to the grayscale images, the preprocessed user provided digital image, wherein the damage detection neural network model is trained to, without a use of a reference image of an undamaged vehicle, determine a location of the vehicle damage, a repair part corresponding to the vehicle damage, a type of the vehicle damage, and an intensity of the vehicle damage using the preprocessed user provided digital image;
   receiving, from the damage detection neural network model, the location of the vehicle damage, the repair part corresponding to the vehicle damage, the type of the vehicle damage, the intensity of the vehicle damage;
   providing, to a repair cost estimation neural network model, the repair part corresponding to the vehicle damage, the type of the vehicle damage, and the intensity of the vehicle damage, wherein the repair cost estimation neural network model is trained to determine an estimated cost to repair the vehicle damage based on the repair part corresponding to the vehicle damage, the type of the vehicle damage, and the intensity of the vehicle damage;
   receiving, from the repair cost estimation neural network model, the estimated cost to repair the vehicle damage; and
   providing, to the user device, results data comprising an estimated cost to repair the vehicle damage and segmentation data overlaid on the user provided digital image indicating the location of the vehicle damage.

16. The computer-implemented method of claim 15, wherein generating a preprocessed user provided digital image from the user provided digital image comprises normalizing the user provided digital image.

17. The computer-implemented method of claim 16, wherein generating a preprocessed user provided digital image from the user provided digital image further comprises grey scaling the user provided digital image.

18. The computer-implemented method of claim 15, wherein the results data further comprises the type of the vehicle damage.

19. The computer-implemented method of claim 15, wherein the results data further comprises the intensity of the vehicle damage.

20. The computer-implemented method of claim 15, wherein the results data further comprises the repair part associated with the vehicle damage.

\* \* \* \* \*